(12) United States Patent
Roth et al.

(10) Patent No.: US 9,875,121 B2
(45) Date of Patent: *Jan. 23, 2018

(54) API SERVER

(71) Applicant: International Business Machines Corporation, Armonk, NY (US)

(72) Inventors: Issac Jacob Roth, San Francisco, CA (US); Albert K. Tsang, San Carlos, CA (US); Zhaohui Feng, Fremont, CA (US); Ritchie Tyler Martori, Fremont, CA (US); Miroslav Bajtoš, Hradec Králové (CZ)

(73) Assignee: International Business Machines Corporation, Armonk, NY (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/490,644

(22) Filed: Sep. 18, 2014

(65) Prior Publication Data

US 2016/0080493 A1    Mar. 17, 2016

Related U.S. Application Data

(60) Provisional application No. 62/051,924, filed on Sep. 17, 2014.

(51) Int. Cl.
*G06F 15/16* (2006.01)
*G06F 9/455* (2006.01)
(Continued)

(52) U.S. Cl.
CPC .......... *G06F 9/45529* (2013.01); *G06F 9/466* (2013.01); *G06F 9/54* (2013.01);
(Continued)

(58) Field of Classification Search
CPC ...... G06F 9/45529; G06F 9/466; G06F 9/541; G06F 9/547; G06F 21/6236; H04L 67/02; H04L 67/1097; H04L 67/42
See application file for complete search history.

(56) References Cited

U.S. PATENT DOCUMENTS 6,029,231 A * 2/2000 Blumenau ............. G06F 3/0617
                                                    709/217
7,373,632 B1   5/2008 Kawaguchi et al.
(Continued)

OTHER PUBLICATIONS

Kotamraju, Jitendra, "Java API for JSON Processing: An Introduction to JSON," Jul. 2013, 3 pages, Oracle.

*Primary Examiner* — Dhairya A Patel
(74) *Attorney, Agent, or Firm* — Schmeiser, Olsen & Watts, LLP; John R. Pivnichny

(57) ABSTRACT

Some embodiments of the invention provide a novel server for processing application programming interface (API) requests. In some embodiments, the API server is written in JavaScript. For example, in some embodiments, the API-accessible objects of this server are each defined in terms of a JavaScript file and a JSON (JavaScript Object Notation) file. At runtime, a runtime processor instantiates each JavaScript object from its associated JavaScript and JSON files. Once instantiated, the JavaScript object can be used to process API requests that refer to the JavaScript object. Some embodiments use novel JSON file structures that allow these embodiments to define rich JavaScript models.

18 Claims, 8 Drawing Sheets

(51) Int. Cl.
  *H04L 29/08* (2006.01)
  *G06F 21/62* (2013.01)
  *G06F 9/54* (2006.01)
  *G06F 9/46* (2006.01)
  *H04L 29/06* (2006.01)
  *G06F 21/33* (2013.01)

(52) U.S. Cl.
  CPC ............ *G06F 9/541* (2013.01); *G06F 9/547* (2013.01); *G06F 21/6236* (2013.01); *H04L 67/02* (2013.01); *H04L 67/1097* (2013.01); *H04L 67/42* (2013.01); *G06F 21/335* (2013.01); *G06F 21/6218* (2013.01); *G06F 2221/2141* (2013.01)

(56) References Cited

U.S. PATENT DOCUMENTS

| | | | | |
|---|---|---|---|---|
| 8,813,225 | B1* | 8/2014 | Fuller | H04L 63/10 726/23 |
| 9,304,796 | B1* | 4/2016 | Douglas | G06F 9/45533 |
| 9,419,884 | B1* | 8/2016 | Li | H04L 43/50 |
| 9,424,003 | B1* | 8/2016 | Neumann | G06F 8/30 |
| 2004/0156363 | A1* | 8/2004 | Walls | H04L 49/103 370/389 |
| 2008/0313660 | A1 | 12/2008 | Malik et al. | |
| 2011/0016449 | A1 | 1/2011 | Yao et al. | |
| 2012/0016999 | A1* | 1/2012 | Kieselbach | G06F 17/30607 709/229 |
| 2012/0089562 | A1 | 4/2012 | Dermigio et al. | |
| 2012/0290645 | A1 | 11/2012 | Arvidsson et al. | |
| 2013/0204894 | A1* | 8/2013 | Faith | G06Q 30/0631 707/769 |
| 2013/0239128 | A1 | 9/2013 | Dawson et al. | |
| 2014/0047368 | A1 | 2/2014 | Yang et al. | |
| 2014/0047423 | A1* | 2/2014 | Pizlo | G06F 8/443 717/153 |
| 2014/0067866 | A1 | 3/2014 | Chen | |
| 2014/0095324 | A1* | 4/2014 | Cabral | G06Q 30/08 705/14.71 |
| 2014/0122996 | A1* | 5/2014 | Gupta | G06F 9/4443 715/234 |
| 2014/0281909 | A1* | 9/2014 | Pinto | G06F 17/30076 715/234 |
| 2014/0337257 | A1* | 11/2014 | Chatterjee | G06N 99/005 706/12 |
| 2014/0337467 | A1 | 11/2014 | Pech et al. | |
| 2014/0372861 | A1 | 12/2014 | Lawless et al. | |
| 2015/0089469 | A1 | 3/2015 | Shakespeare et al. | |
| 2015/0229613 | A1* | 8/2015 | Baum | H04L 63/061 713/171 |
| 2015/0363437 | A1* | 12/2015 | Florez | G06F 17/30303 707/692 |

* cited by examiner

API SERVER

CLAIM OF BENEFIT TO PRIOR APPLICATION

This application claims benefit to U.S. Provisional Patent Application 62/051,924, filed Sep. 17, 2014, which is incorporated herein by reference.

REFERENCE TO COMPUTER PROGRAM LISTINGS

This application incorporates by reference a computer program listing appendix in an ASCII text file having a title "2014_09_17_SLOO_P0001P_Appendices.txt", which includes an Appendix A portion, an Appendix B portion, and an Appendix C portion. The text file "2014_09_17_SLOO_P0001P_Appendices.txt" has a size of 56347 bytes and was created on Sep. 17, 2014.

BACKGROUND

With the proliferation of mobile devices, the need for servers that can process application programming interface (API) requests from the mobile devices has never been greater. There is also a need for robust frameworks that allow developers create programs for processing such API requests on clients and on the server. Ideally, this framework would make the processing of such requests on a client or on a server seamless.

SUMMARY

Some embodiments of the invention provide a novel server for processing application programming interface (API) requests. In some embodiments, the API server is written in JavaScript. For example, in some embodiments, the API-accessible objects of this server are each defined in terms of a JavaScript file and a JSON (JavaScript Object Notation) file. At runtime, a runtime processor instantiates each JavaScript object from its associated JavaScript and JSON files. Once instantiated, the JavaScript object can be used to process API requests that refer to the JavaScript object. Some embodiments use novel JSON file structures that allow these embodiments to define rich JavaScript models, as further described below.

To process API calls to JavaScript objects, the API server of some embodiments needs to exchange data with (e.g., to read from or to write to) a variety of different backend data storages (e.g., relational databases, REST accessible data storages, SOAP accessible data storages, memory, etc.) through a variety of different interfaces. To allow for this, the server of some embodiments includes a data storage abstractor and a data storage connector. The data storage abstractor provides a layer of data abstraction between the JavaScript (JS) objects and the underlying data in the backend data storages. For instance, in some embodiments, the abstractor translates the JavaScript object definitions to the object definitions of the underlying data storages. In other embodiments, the abstractor simply provides a set of functions that allows the JS objects to exchange data with the backend data storages. For instance, in some embodiments, the abstractor provides create, retrieve, update, and delete (CRUD) functions to connect the JavaScript objects to the backend data storages. In these or other embodiments, the abstractor can also connect to the backend data storages through REST APIs, SOAP web services, and other storage services.

In some embodiments, the data storage abstractor is hacked by the data storage connector, which implements the data exchange logic using data storage drivers or other client APIs. In some embodiments, the JavaScript objects also connect to the backend data storages through a replication manager that connects the JavaScript objects to the data storage connectors and synchronizes the data between the JS object and the backend data storage. Instead of using the replication manager to synchronize the data between a JS object and a backend data storage, or in conjunction with this usage, some embodiments use the replication manager to synchronize the data between two API servers or between an API server and a client.

The JavaScript API server in some embodiments can handle a large number of concurrent sessions with a large number of devices (e.g., computers, mobile devices, etc.). For instance, in some embodiments, this API server has a non-blocking input/output (I/O) interface that can concurrently maintain a large number of concurrent sessions. The I/O interface of some embodiments is a single-threaded process that does not consume too much of the system resources, which, in turn allows the server to be able to handle a large number of concurrent sessions. The JavaScript API server in some embodiments can maintain a session with a connecting device (e.g., a connecting mobile device) for a long duration of time and without interruption. In some embodiments, this API server can maintain a session for a long duration because it uses a web socket manager to manage the connection session.

In some embodiments, the JavaScript API server exposes its APIs (i.e., exposes its accessible objects through APIs) to other devices (e.g., other servers, computers, mobile devices) through non-proprietary web services. For instance, the server of some embodiments exposes its APIs through REST (Representational State Transfer) web services. Other embodiments expose the APIs through other services.

The API server of some embodiments processes API requests from client devices (e.g., mobile devices) that have the capability to process some or all of their API requests locally. In these embodiments, the client devices may process an API locally by accessing the local data stores through an object (called a proxy object below) that resides on the client, or by directing the server to process this API request remotely. The proxy object in some embodiments is a JS object that is constructed from a class description that is specified by a JavaScript file and a JSON file on the client. For instance, in some embodiments, the proxy objects on the client device are JS objects when the proxy objects are part of an application that executes on top of a JS engine of a browser on the client device. In such cases, the JS and JSON files on the client device are identical or similar to the two corresponding files that are used to define the object on the API server in some embodiments.

In other embodiments, the proxy object on a client device can be a non-JS object (e.g., a Java object or an objective C object). For instance, in some embodiments, the proxy objects on the client device are non-JS objects when the proxy objects are part of an application that executes natively on top of the operating system (e.g., on top of iOS or Android operating system) of the client device. For applications that run natively on a device's operating system, some embodiments do not distribute models that are defined by reference to JS and JSON files. In some of these embodiments, the client device includes an adapter that has the capability to query the server dynamically for models and then instantiates them as native object equivalent (e.g., as objective C objects in iOS and as Java objects in Android) at runtime.

In some embodiments, the API calls on the client and server are identical and hence are referred to as isomorphic API calls. In some of these embodiments, the format of the API calls is exactly the same. In other embodiments, the format is somewhat different (e.g., when JavaScript objects are being executed on the server, while Java or Objective C objects are being executed on the clients). However, even in these embodiments, the APIs on the server and client can be isomorphic as the same set of parameters are passed along with the API and the same set of parameters are returned from the API on the client and the server. In other words, when applications run natively on the client device operating system, the proxy object that is instantiated in the native environment represents and is an isomorphic equivalent of what is specified on the server.

As mentioned above, some embodiments use novel JSON file structures that allow these embodiments to define rich JavaScript models, each of which can be instantiated at runtime to be an object that can process an API request (e.g., on the client or on the server). Also, as mentioned above, each model includes (1) a JSON file that describes the properties of the object, and (2) a JavaScript file that describes the behaviors of the object.

In some embodiments, the JSON file structure includes (1) a rich description of properties that relate to data tuples stored on data storages, (2) control logic for restricting access to the data tuples, and (3) relationship attributes that define the relationship between the JSON file's model and other models. The rich property attributes of the JSON file allows a data storage to be specifically identified in terms of its location, name, and attributes, and also allows one JSON file to pull values for one or more properties from two or more data storages.

The relationship attributes of a particular object's JSON file allows one or more links to other objects to be specified when the particular object is being instantiated. In some embodiments, the control logic of a JSON file includes validation rules and access control list (ACL) rules. The validation rules in some embodiments ensure that the data tuples that are gathered from one or more data storages meet a required constraint that is specified for them in the rules. For instance, a validation rule might require that "Car" object have an associated VIN attribute. When a retrieved Car data tuple does not have a VIN attribute, the data tuple is not accepted as a Car because it does not meet the specified constraint for a Car.

ACL rules in some embodiments ensure that the portion of a retrieved data tuple that is presented on a device satisfies certain access control criteria. For instance, an API to a bank account object might retrieve one set of values on both a computer and a mobile device. However, while the object's ACL rule might allow all of the values to be presented on the computer, the object's ACL rule might prevent some of the data values (e.g., bank account number) from being presented on the mobile device, because mobile devices might be as being inherently less secure than computers. In some embodiments, the ACLs and validation rules are implemented as hooks (i.e., function calls) that are called before or after calling of the API. In other embodiments, the ACLs and validation rules are processed by the runtime processor before or after processing the API request.

Some embodiments of the invention provide a framework for defining models by defining JS files and/or JSON files. As mentioned above, a model can be defined by an associated pair of JS file and JSON file in some embodiments. In some embodiments, the framework pre-defines one set of functions for each object that is instantiated from each model. For instance, in some embodiments, each JS object can perform the CRUD functions.

The framework of some embodiments allows additional functions to be written in the JS file in order to augment and override the set of functions of an object that is instantiated from the JS file. These additional functions can be written as hooks (e.g., function calls that are processed before or after a baseline function) that can be processed locally (e.g., on a client device) or remotely (e.g., on the server). The processing of these function calls is quite simple given the isomorphic nature of the API calls in some embodiments. The call can be made similarly on the client device or on the server. Also, on the client device, the call can be made without consideration of whether the call is going to be processed locally or remotely. In some embodiments, the framework can determine whether to process this call locally or remotely based on pre-defined conditions for processing the call or dynamically assessed conditions for processing the call.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel server for processing application programming interface (API) requests. In some embodiments, the API server is written in JavaScript. For examples, in some embodiments, the API-accessible objects of this server are each defined in terms of a JavaScript (JS) file and a JSON file. At runtime, a runtime processor instantiates each JavaScript object from its associated JS and JSON files. In some embodiments, a JS file and a JSON file are associated with each other through their common names.

Figure 1:
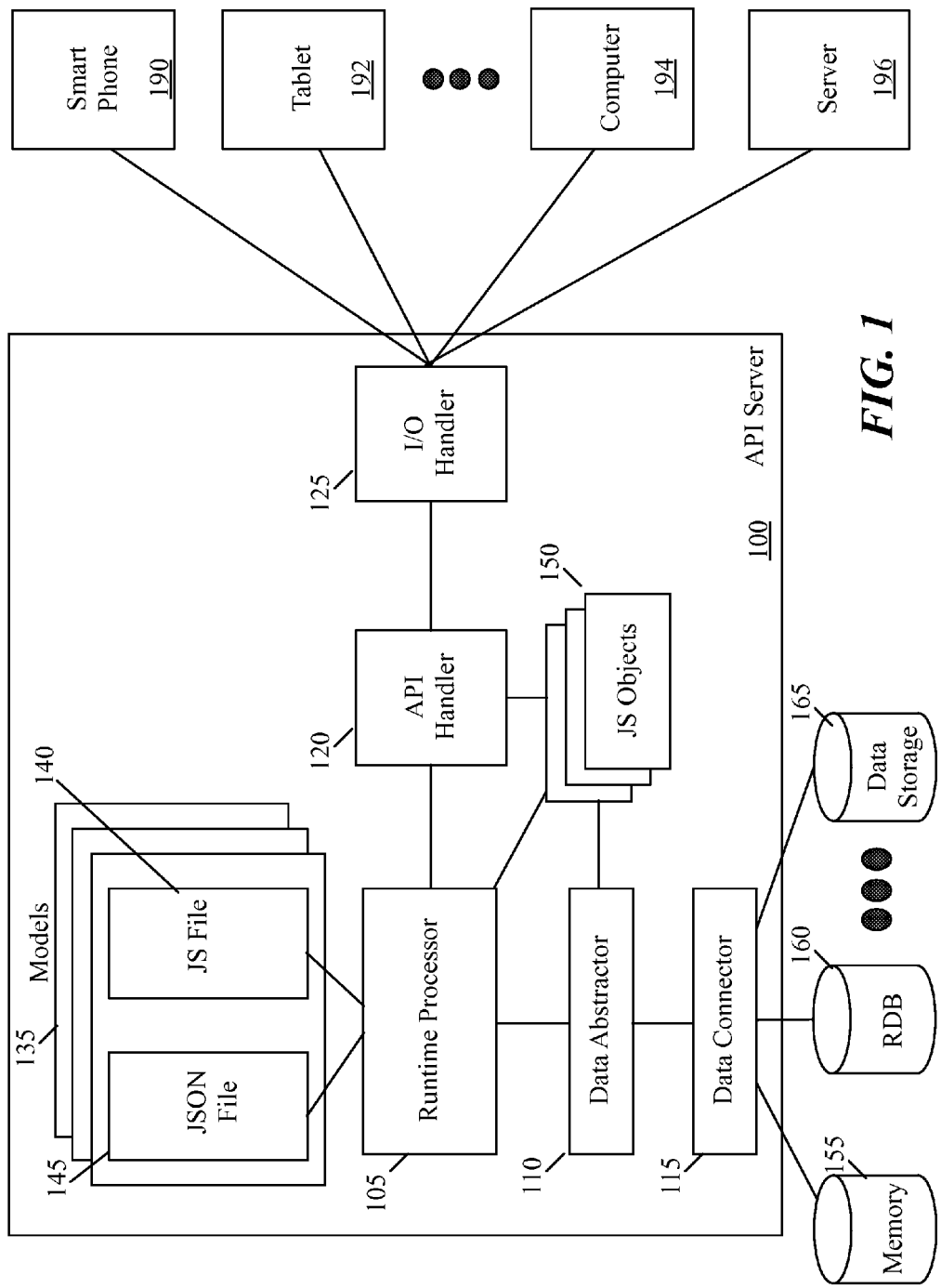
FIG. 1 illustrates a JavaScript API server of some embodiments of the invention.

FIG. 1 illustrates one such JavaScript API server 100 of some embodiments of the invention. This server can process API requests from a variety of devices, such as smartphones 190, tablets 192, client computers (e.g., laptops, desktops, etc.) 194, server computers 196, and other devices. As shown, this API server includes a runtime processor 105, a data abstractor 110, a data storage connector 115, an API handler 120, and an I/O handler 125. Also, as shown, this API server stores the description of multiple JavaScript models 135, with each model defined in terms of a JavaScript file 140 and a JSON file 145.

The runtime processor 105 in some embodiments instantiates a JavaScript object 150 for each model based on the object's description that is contained in its associated JavaScript model (i.e., that is contained in the JS object's associated JS file and JSON file). The Appendix A portion of the incorporated ASCII text file computer program listing appendix provides the source code within a JS framework of some embodiments that can be used to instantiate a JS object from the description of the object in a JS file and a JSON file. Once instantiated, the JavaScript object can be used to process API requests from other devices (such as mobile devices, client computers, and other server computers). These other devices will be referred to below as client devices of the API server.

To process API calls, the JS objects of some embodiments needs to exchange data with (e.g., to read from or to write to) a variety of different backend data storages 155-165 that have a variety of different interfaces. The data storage abstractor 110 and the data storage connector 115 allow these JS objects to exchange data with the backend data storages. The data storage abstractor 110 provides a layer of data abstraction between the JavaScript objects and the underlying data in the backend data storages. For instance, in some embodiments, the abstractor 110 translates the JavaScript object definitions to the object definitions of the underlying data storages. In other embodiments, the abstractor 110 simply provides a set of functions that allows the JS objects to exchange data with the backend data storages. For instance, in some embodiments, the abstractor 110 provides create, retrieve, update, and delete (CRUD) functions to connect the JS objects to the backend data storages. In these or other embodiments, the abstractor 110 can also connect to backend data storages through REST APIs, SOAP web services, and other data storage services.

The data storage abstractor 110, in some embodiments, is backed by the data storage connector 115, which implements the data exchange logic using data storage drivers or other client APIs. The JS objects also connect to backend data storages in some embodiments through a replication manager (not shown) that connects the JavaScript object to the data storage connectors and synchronizes the data between the JS object and the backend data storage. Such a replication manager is also used in some embodiments to synchronize the data between two API servers or between an API server and a client. In some embodiments, the replication manager synchronizes the data between the API server and another device (e.g., a server computer or a client device, such as a mobile device or a client computer) by synchronizing a persisted version of the JS objects that are stored on the API server and the other device.

Through the I/O manager 125, the API server in some embodiments can handle a large number of concurrent sessions with a large number of devices (e.g., computers, mobile devices, etc.). For instance, in some embodiments, this manager has a non-blocking input/output (I/O) interface that can concurrently maintain a large number of concurrent sessions. The I/O interface of some embodiments is a single-threaded process that does not consume too much of the system resources, which in turn, allows the server to be able to handle a large number of concurrent sessions. This I/O manager 125 in some embodiments can also maintain a session with a connecting device (e.g., a connecting mobile device) for a long duration of time and without interruption. In some embodiments, the I/O manager 125 can maintain a session for a long duration because it uses a web socket manager to manage the connection session.

The API handler 120 exposes the API server's JS objects 150 to the other devices (e.g., other servers 196, computers 194, and mobile devices 190 and 192). In some embodiments, the handler 120 uses non-proprietary web services to expose the APIs. For instance, the handler 120 of some embodiments exposes the JS object APIs through REST web services. Other embodiments expose the APIs through other services.

Figure 2:
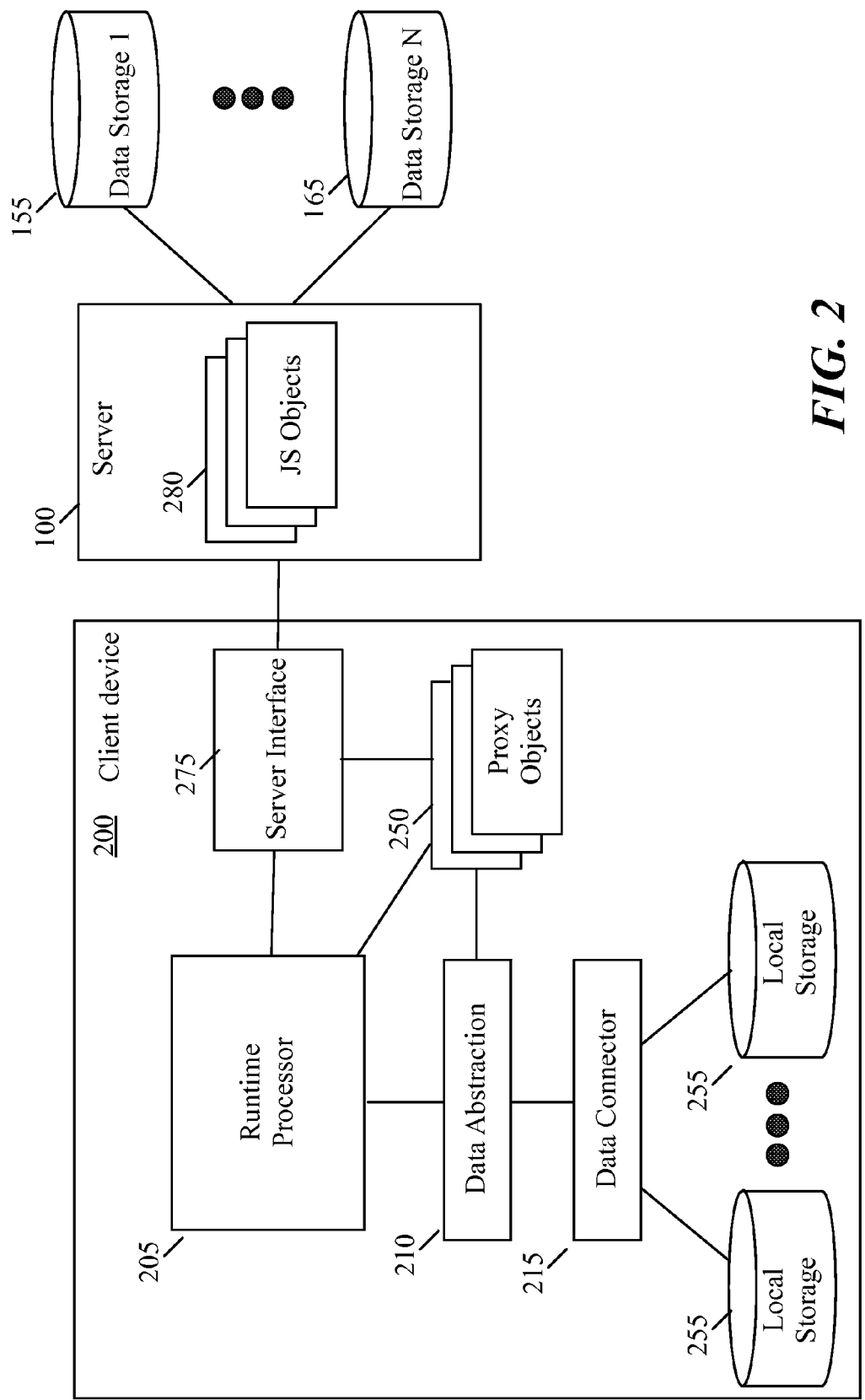
FIG. 2 presents a conceptual illustration of the API processing modules of a client device of some embodiments.

The API server of some embodiments processes API requests from client devices (e.g., mobile devices) that have the capability to process some or all of their API requests locally. FIG. 2 presents a conceptual illustration of the API processing modules of one such client device. As shown, this client device 200 has a runtime processor 205 that instantiates several proxy objects 250 that are proxies on the client device for several JS objects that operate on the API server 100.

Once instantiated, a proxy object 250 on the client can be used to process an API request from local data storages 255 that reside on the client device 200, or by calling a corresponding JS object 280 that resides on the API server 100 so that this object 280 can process this request (e.g., by using backend data storages 155-165). As described in the concurrently filed U.S. patent application Ser. No. 14/490,633, entitled "Dynamic Determination of Local and Remote API Calls," which is incorporated herein by reference, the determination of whether the API request should be processed locally on the client or remotely on the server is made dynamically on the client in some embodiments. This dynamic decision is based on conditions that are dynamically assessed on the client in some embodiments.

As shown, the proxy objects 250 access the local data storages 255 through a data abstractor 210 and a data connector 215, which provide the same operations on the client device 200 as the data abstractor 110 and the data connector 115 provide on the server 100. In some embodiments, the data abstractor 210 and the data connector 215 are not used in some of the client-side environments as the objects 250 can pull data directly from the client's local storages without going through the data abstraction and connection layers. Also, the proxy object 250 accesses its corresponding JS object 280 on the API server through one or more modules that form a server interface 275. Several examples of these modules will be further described below.

In the discussion below, an object 250 on the client is referred to as a proxy object, as it can act on the client as a proxy of the object 280 on the server. As further described below, the proxy object on a client device can be a different type of object (e.g., a JS object, a Java object, or an objective C object) in some embodiments. For instance, in some embodiments, some mobile applications execute on top of a JS engine of a browser on a client device, while other mobile applications execute natively on top of the operating system of the client device. In some of these embodiments, the applications that execute on top of the browser's JS engine instantiate JS proxy objects, while the applications that run natively instantiate other types of proxy objects (e.g., Java objects or objective C objects).

In some embodiments where the proxy object is a JS object (e.g., when the proxy objects are part of an application that executes on top of a JS engine of a browser on the client device), the proxy object is constructed from a class description that is specified by a JavaScript file and a JSON file on the client. In some of these embodiments, the JS and JSON files on the client device are identical or similar to the two corresponding files that are used to define the object on the API server in some embodiments.

When the proxy object on a client device is not a JS object (e.g., it is a Java object or an objective C object that is defined to run natively on the client device's OS), some embodiments do not distribute models that are defined by reference to JS and JSON files. In some of these embodiments, the client device includes an adapter that has the capability to query the server dynamically for an object description, and then, based on the received object description, instantiate a native object (e.g., as objective C objects in iOS and as Java objects in Android) at runtime.

In some embodiments, the API calls on the client and server are identical and hence are referred to as isomorphic API calls. In some of these embodiments, the format of the API calls is exactly the same. In other embodiments, the format is somewhat different (e.g., when JavaScript objects are being executed on the server, while Java or Objective C objects are being executed on the clients). However, even in these embodiments, the APIs on the server and client can be isomorphic as the same set of parameters are passed along with the API and the same set of parameters are returned from the API on the client and the server. In other words, when applications run natively on the client device operating system, the proxy object that is instantiated in the native environment represents and is an isomorphic equivalent of what is specified on the server.

Some embodiments of the invention provide a framework for defining models by defining JS files and/or JSON files. As mentioned above, a model can be defined by an associated pair of JS file and JSON file in some embodiments. In some embodiments, the framework pre-defines one set of functions for each object that is instantiated from each model. For instance, in some embodiments, each JS object can perform the CRUD functions.

The framework of some embodiments allows additional functions to be written in the JS file in order to augment and override the set of functions of an object that is instantiated from the JS file. These additional functions can be written as hooks (e.g., function calls that are processed before or after a baseline function) that can be processed locally (e.g., on a client device) or remotely (e.g., on the server). The processing of these function calls is quite simple given the isomorphic nature of the API calls in some embodiments. The call can be made identically on a client device irrespective of whether it is going to be processed locally or remotely. The framework can determine whether to process this call locally or remotely based on pre-defined conditions for processing the call or dynamically assessed conditions for processing the call.

Figure 3:
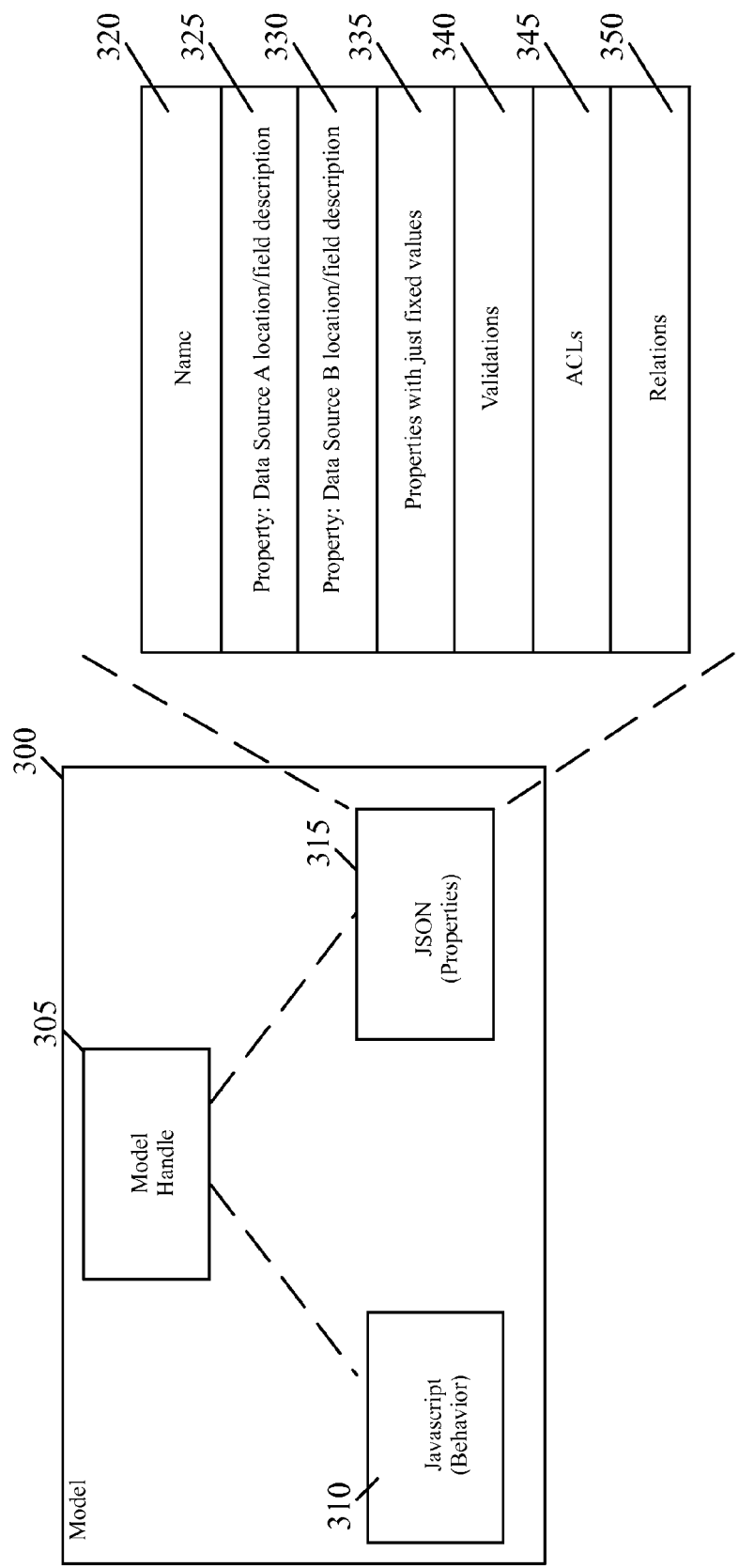
FIG. 3 illustrates a novel model description of some embodiments of the invention.

FIG. 3 illustrates a novel model description of some embodiments of the invention. This model description uses a novel JSON file structure that allows these embodiments to define rich JavaScript models. As mentioned above, each model can be instantiated at runtime to be an object that can process API requests on a client device or on a server. As shown, the model 300 in these embodiments includes (1) a high level handle 305, (2) a JavaScript file 310 that describes the behaviors of the object, and (3) a JSON file 315 that describes the attributes (e.g., the properties, relations, control logic, etc.) of the object.

As shown, besides a name key 320, the JSON file 315 of some embodiments includes (1) a rich description of properties 325 and 330 that relate to data tuples stored on data storages, (2) properties 335 that have fix values and do not relate to any data tuples stored on data storages, (3) control logics 340 and 345 for restricting access to the data tuples, and (4) relationship attributes 350 that define the relationship between the JSON file's model and other models. In some embodiments, the rich property attributes 325 and 330 of the JSON file allow a data storage to be specifically identified in terms of its location, name, and attributes, and also allows one JSON file to pull values for one or more properties from two or more data storages.

In some embodiments, the control logic 340 and 345 of a JSON file include validation rules and access control list (ACL) rules. The validation rules 340 in some embodiments ensure that the data tuples that are gathered from one or more data storages meet a required constraint that is specified for them in the rules. For instance, a validation rule might require that "Car" object have an associated VIN attribute. When a retrieved Car data tuple does not have a VIN attribute, the data tuple is not accepted as a Car because it does not meet the specified constraint for a Car.

ACL rules 345 in some embodiments ensure that the portion of a retrieved data tuple that is presented on a device satisfies certain access control criteria. For instance, an API to a bank account object might retrieve one set of values on both a computer and a mobile device. However, while the object's ACL rule might allow all of the values to be presented on the computer, the object's ACL rule might prevent some of the data values (e.g., bank account number) from being presented on the mobile device, because mobile devices might be as being inherently less secure than computers. In some embodiments, the ACLs and validation rules are implemented as hooks (i.e., function calls) that are called before or after processing the API.

The relations attribute 350 of a particular object's JSON file allows one or more links to other objects to be specified when the particular object is being instantiated.

Several examples of JSON files will now be described to further elaborate on the JSON file format of some embodiments. In some embodiments, a model is named as model-name.json, where model-name is the name of the model. For example customer.json for a customer model. The customer model's JSON file may specify the following attributes,

```
{
    "name": "Customer",
    "base": "User",
    "idInjection": false,
    "strict": true,
    "options": { ... },
    "properties": { ... },
    "validations": [...],
    "relations": {...},
    "acls": [...],
    "scopes": {...},
    "indexes" : { ...},
    "methods": [...]
}
``` where the above mentioned keys in this file, are defined as follows.

| Attribute | Type | Description |
|---|---|---|
| name | String | Name of the model. Required |
| plural | String | Plural form of the model name. Optional: Defaults to plural of name property using standard English conventions. |
| base | String | Name of another model that this model extends. The model will "inherit" properties and methods of the base model. Required |
| idInjection | Boolean | Whether to automatically add an id property to the model: true: id property is added to the model automatically. This is the default. false: id property is not added to the model Not required |
| strict | Boolean | Specifies whether the model accepts only predefined properties or not. One of: true: Only properties defined in the model are accepted. Use this mode if developer wants to make sure only predefined properties are accepted. false: The model will be an open model. All properties are accepted, including the ones that not predefined with the model. This mode is useful if the mobile application just wants to store free form JSON data to a schema-less database such as MongoDB. Undefined: Default to false unless the data source is backed by a relational database such as Oracle or MYSQL. |
| options | Object | JSON object that specifies model options. |
| properties | Object | JSON object that specifies the properties in the model. |
| validation | Object | JSON object that specifies validation constrains in the model |
| relations | Object | Object containing relation names and relation definitions. |
| Acls | Array | Set of ACL specifications that describes access control for the model. |
| scopes | Object | Object that allows developer to specify commonly-used queries that the developer can reference as method calls on a model. |
| indexes | Object | Object for declaring method |
| methods | | Methods of object |

In this set of attributes, the options key specifies data source-specific options. When a model is attached to a data source of a certain type (e.g., Oracle or MySQL), a developer can specify the name of the database schema and the table as properties under the key with the name of the connector type such as below:

```
...
"options": {
    "mysql": {
        "table": "location"
    },
    "mongodb": {
        "collection": "location"
    },
    "oracle": {
        "schema": "BLACKPOOL",
        "table": "LOCATION"
    }
},
...
```

Properties key defines one or more properties. One example of a basic property definition is as follows:

```
"properties": {
    "firstName": {
        "type": "String",
        "required": "true"
    },
    "id": {
        "type": "Number",
        "id": true,
        "doc": "User ID"
    },
```

Each property that is listed under the properties key is an object that has keys described in the following table.

| Key | Required? | Type | Description |
|---|---|---|---|
| doc | No | String | Documentation for the property. |
| id | No | Boolean | Whether the property is a unique identifier. Default is false. |
| required | No | Boolean | Whether a value for the property is required. Default is false. |
| type | Yes | String | Property type. In some embodiments, can be null, Boolean, number, string, object, array, date, buffer, and GeoPoint. |
| * | No | Various | |

A model representing data to be persisted in a database usually has one or more ID properties (as identified by the "id" key) that uniquely identify the model instance. For example, the user model might have user IDs. By default, if no ID properties are defined and the idInjection property is true (or is not set, since true is the default), the model builder of some embodiments automatically adds an id property to the model as follows: id: {type: Number, generated: true, id: true}. The "generated" property indicates the ID will be automatically generated by the database. If true, the connector decides what type to use for the auto-generated key. For relational databases (e.g., Oracle or MySQL), it defaults to number. If the ID is generated on the client side, it is set to false in some embodiments.

To explicitly specify a property as ID, the id property of the option should be set to true in some embodiments. The ID property value must be one of:
  true: the property is an ID.
  false (or any value that converts to false): the property is not an ID (default).
  Positive number, such as 1 or 2: the property is the index of a composite ID.
In database terms, key column(s) are ID properties. Such properties are defined with the "id" attribute set to true or a number as the position for a composite key. For example,

```
{
    "myId": {
        "type": "string",
        "id": true
    }
}
```

When a model doesn't have explicitly-defined ID properties, the model builder of some embodiments automatically injects a property named "id" unless the idInjection option is set to false. If an ID property has "generated" set to true, the data storage connector decides what type to use for the auto-generated key. For example for SQL Server, it defaults to number. The data abstractor CRUD methods expect the model to have an "id" property if the model is backed by a database. A model without any "id" properties can only be used without attaching to a database.

Some embodiments allow the definition of a composite ID that has more than one property. For example, an inventory object can be defined as:

```
var InventoryDefinition = {
    productId: {type: String, id: 1},
    locationId: {type: String, id: 2},
    qty: Number
}
```

In this example, the composite ID is (productId, locationId) for an inventory model.

When using an RDB data source, some embodiments allow a developer to specify the following properties that describe the columns in the database.

| Property | Type | Description |
| --- | --- | --- |
| columnName | String | Column name |
| dataType | String | Data type as defined in the database |
| dataLength | Number | Data length |
| dataPrecision | Number | Numeric data precision |
| dataScale | Number | Numeric data scale |
| nullable | Boolean | If true, data can be null |

For example, a property can be mapped to a column in an Oracle database table, by stating the following in the JSON file:

```
...
"name": {
    "type": "String",
    "required": false,
    "length": 40,
    "oracle": {
        "columnName": "NAME",
        "dataType": "VARCHAR2",
        "dataLength": 40,
        "nullable": "Y"
    }
}
...
```

This is a rich description of a backend data storage and a particular data tuple field (i.e., columnName, dataType, dataLength, etc.) in this storage. Providing such a rich description in a BON file of a model is quite novel, as other prior approaches do not provide such rich attribute descriptions in JSON files.

In some embodiments, format conversions are declared in properties, per the keys in the following table:

| Key | Type | Description |
| --- | --- | --- |
| trim | Boolean | Whether to trim the string |
| lowercase | Boolean | Whether to convert a string to lowercase |
| uppercase | Boolean | Whether to convert a string to uppercase |
| format | Regular expression | Format for a date property. |

As mentioned above, the validation key specifies constraints on data with validations properties. The table below provides an example of keys that can be used to define validation constraints in the JSON file in some embodiments.

| Key | Type | Description |
| --- | --- | --- |
| default | Any | Default value of the property. |
| required | Boolean | Whether the property is required. |
| pattern | String | Regular expression pattern that a string should match |
| max | Number | Maximum length for string types. |
| min | Number | Minimum length for string types. |
| length | Number | Maximum size of a specific type, for example for CHAR types. |

One example of setting a validation constraint with such keys is provided below.

```
"username": {
    "type": "string",
    "doc": "User account name,
    "min": 6,
    "max": 24
}
```

This validation constraint states that the username has to be string, its documentation has to contain "User account name", and it has to be between 6-24 characters long. The validation class of the framework of some embodiments will be further described below.

As mentioned above, the relations key defines relationships between models through a JSON object. Each key in this object is the name of a related model, and the value is a JSON object as described in the table below. For example, the JSON file snippet below specifies that a JSON model belongs to an account model, and has a "hasMany" relationship to transaction and accessToken models.

```
"relations": {
    "accessTokens": {
        "model": "accessToken",
        "type": "hasMany",
        "foreignKey": "userId"
    },
    "account": {
        "model": "account",
        "type": "belongsTo"
    },
    "transactions": {
        "model": "transaction",
        "type": "hasMany"
    },
    ...
```

The table below provides an example of keys that can be used to define relations in the JSON file in some embodiments.

| Key | Type | Description |
|---|---|---|
| model | String | Name of the related model. Required. |
| type | String | Relation type. Required.<br>One of:<br>hasMany<br>belongsTo<br>hasAndBelongsToMany<br>For hasMany, developer can also specify a hasManyThrough relation by adding a "through" key: {through: 'modelName'} |
| foreignKey | String | Optional foreign key used to find related model instances. |
| through | String | Name of model creating hasManyThrough relation. See example below. |

Example of hasManyThrough:

```
"patient": {
    "model": "physician",
    "type": "hasMany",
    "through" : "appointment"
}
```

In this example, a patient model can have many relationships with appointments through one or more physician models.

The value of an ACL key is an array of objects that describes the access controls for the model. Each object has the keys described in the table below.

```
"acls": [
    {
        "permission": "ALLOW",
        "principalType": "ROLE",
        "principalId": "$everyone",
        "property": "myMethod"
    },
    ...
]
```

The table below provides a list of keys by which an ACL key can be defined in some embodiments.

| Key | Type | Description |
|---|---|---|
| accessType | String | The type of access to apply. One of:<br>READ<br>WRITE<br>EXECUTE<br>ALL (default) |
| permission | String | Type of permission granted. Required.<br>One of:<br>ALARM - Generate an alarm, in a system dependent way, the access specified in the permissions component of the ACL entry.<br>ALLOW - Explicitly grants access to the resource.<br>AUDIT - Log, in a system dependent way, the access specified in the permissions component of the ACL entry.<br>DENY - Explicitly denies access to the resource. |
| principalId | String | Principal identifier. Required.<br>The value must be one of:<br>A user ID (String\|number\|any)<br>One of the following predefined dynamic roles:<br>$everyone - Everyone<br>$owner - Owner of the object<br>$related - Any user with a relationship to the object<br>$authenticated - Authenticated user<br>$unauthenticated - Unauthenticated user<br>A static role name |
| principalType | String | Type of the principal. Required.<br>One of:<br>Application<br>User<br>Role |
| property | | Specifies a property/method/relation on a given model. It further constrains where the ACL applies. |

A scopes key enables a developer to specify commonly-used queries that the developer can reference as method calls on a model. The scopes key defines one or more scopes (named queries) for models. A scope key maps a name to a predefined filter object to be used by the model's find( ) method; for example:

```
"scopes": {
    "vips": {"where": {"vip": true}},
    "top5": {"limit": 5, "order": "age"}
}
```

The snippet above defines two named queries for the model:

vips: Find all model instances with vip flag set to true top5: Find top five model instances ordered by age Within the scopes object, the keys are the names, and each value defines a filter object. In some embodiments, a developer can also define a scope programmatically using a model's scope( ) method, for example:

```
User.scope('vips', {where: {vip: true}});
User.scope('top5': {limit: 5, order: 'age'});
```

A developer can call the methods defined by the scopes in some embodiments. For example:

```
User.vips(function(err, vips) {
    ...
});
```

Methods key in the JSON file allows a developer to declare remote methods in the JSON file. Also, indexes can be declared for a model with the "indexes" option. One example of declaring indexes is as follows:

```
"indexes": {
    "name_age_index": {
        "keys": {"name": 1, "age": -1}
    },
    "age_index": {"age": -1}
}
```

The snippet above creates two indexes for the declaring model: (1) a composite index named 'name_age_index' with two keys: 'name' in ascending order and 'age' in descending order and (2) a simple index named 'age_index' with one key: 'age' in descending order. The full syntax for an index within the 'indexes' is:

```
"<indexName>": {
  "keys": {
    "<key1>": 1,
    "<key2>": -1
  },
  "options": {
    "unique": true
  }
}
```

In this syntax, '1' specifies 'ascending' while '−1' specifies 'descending'. If no 'options' are needed, developer can use a shortened form:

```
"<indexName>": {
  "<key1>": 1,
  "<key2>": -1
}
```

Indexes can be marked at model property level too, for example:

```
{
  "name": { "type": "String", "index": true },
  "email": { "type": "String", "index": {"unique": true} },
  "age": "Number"
}
```

Two indexes will be created, one for the 'name' key and another one for the 'email' key. The 'email' index is unique.

As mentioned above, one model can be defined by extending another model. The model that extends from another model will "inherit" properties and methods of the other "base" model. The following snippet provides an example of a model being extended from another.

```
var properties = {
  firstName: {type: String, required: true}
};
var options = {
  relations: {
    accessTokens: {
      model: accessToken,
      type: hasMany,
      foreignKey: userId
    },
    account: {
      model: account,
      type: belongsTo
    },
    transactions: {
      model: transaction,
      type: hasMany
    }
  },
  acls: [
    {
      permission: ALLOW,
      principalType: ROLE,
      principalId: $everyone,
      property: myMethod
    }
  ]
};
var user = loopback.Model.extend('user', properties, options);
```

The validation class, Validatable, of the framework of some embodiments will now be described. This class provides methods that add validation capabilities to models.

Each of this validations run when an obj.isValid( ) method is called. Each configurator can accept n parameters (n−1 field names and one config). "Config is {Object}" depends on specific validation, but all of them have a message member property. It can be just string, when only one situation is possible, e.g., Post.validatesPresenceOf('title', {message: 'can not be blank'}). In more complicated cases it can be {Hash} of messages (for each case): User.validatesLengthOf('password', {min: 6, max: 20, message: {min: 'too short', max: 'too long'}}).

The validation class methods in some embodiments include:
  Validatable.validatesPresenceOf
  Validatable.validatesAbsenceOf
  Validatable.validatesLengthOf
  Validatable.validatesNumericalityOf
  Validatable.validatesInclusionOf
  Validatable.validatesExclusionOf
  Validatable.validatesFormatOf
  Validatable.validate
  Validatable.validateAsync
  Validatable.validatesUniquenessOf
  validatable.isValid
  ValidationError The Validatable.validatesPresenceOf method validates the presence of one or more specified properties. This method requires a model to include a property to be considered valid. The method fails when validated field is blank. For example,
  Post.validatesPresenceOf('title') validates presence of title.
  Post.validatesPresenceOf('title', {message: 'Cannot be blank'}) provides an example with a custom message
  User.validatesPresenceOf('first', 'last', 'age') validates that model has first, last, and age properties:

The Validatable.validatesPresenceOf method of some embodiments has arguments and error messages as illustrated in the following tables:

| Arguments | | |
| --- | --- | --- |
| Name | Type | Description |
| propertyName | String | One or more property names. |
| errMsg | Object | Optional custom error message. Default is "can't be blank" |

| errMsg | | |
| --- | --- | --- |
| Name | Type | Description |
| message | String | Error message to use instead of default. |

Validatable.validatesAbsenceOf method validates absence of one or more specified properties. This method specifies that a model should not include a property to be considered valid. The Validatable.validatesAbsenceOf method fails when validated field is not blank. For example, Post.validatesAbsenceOf('reserved', {unless: 'special'}), validates absence of reserved.

The Validatable.validatesAbsenceOf method of some embodiments has arguments and error messages as illustrated in the following tables:

| Arguments | | |
|---|---|---|
| Name | Type | Description |
| propertyName | String | One or more property names. |
| errMsg | Object | Optional custom error message. Default is "can't be set" |

| errMsg | | |
|---|---|---|
| Name | Type | Description |
| message | String | Error message to use instead of default. |

Validatable.validatesLengthOf method validates the length of a property. This method requires a property length to be within a specified range. In some embodiments, the Validatable.validatesLengthOf method receives the minimum range of a property (min), the maximum range of the property (max), or the precise length of the property (is). This method returns the following default error messages:

If the length is less than minimum, the method returns min: too short,

If the length is more than maximum, the method returns max: too long, and

If the length is not equal to the received range, the method returns length is wrong Below are a few examples of how a developer can use the Validatable.validatesLengthOf method for a class (model) named "User." In the following example the method returns one of the above default error messages if an error occur:

User.validatesLengthOf('password', {min: 7});
User.validatesLengthOf('email', {max: 100});
User.validatesLengthOf('state', {is: 2});
User.validatesLengthOf('nick', {min: 3, max: 15});

A couple of more examples, for which the length validation method returns custom error messages, are as follows:

User.validatesLengthOf('password', {min: 7, message: {min: 'too weak'}});
User.validatesLengthOf('state', {is: 2, message: {is: 'is not valid state name'}});

The Validatable.validatesLengthOf method of some embodiments has arguments and options as illustrated in the following tables:

| Arguments | | |
|---|---|---|
| Name | Type | Description |
| propertyName | String | Property name to validate. |
| Options | Object | |

| Options | | |
|---|---|---|
| Name | Type | Description |
| is | Number | Value that property must equal to validate. |
| min | Number | Value that property must be less than to be valid. |
| max | Number | Value that property must be less than to be valid. |
| message | bject | Optional Object with string properties for custom error message for each validation: is, min, or max |

Validatable.validatesNumericalityOf method validates numericality of a property (i.e., whether the property is numerical or not). The method requires a value for property to be either an integer or number. The examples for this method are as follows:

User.validatesNumericalityOf('age', {message: {number: ' . . . '}});
User.validatesNumericalityOf('age', {int: true, message: {int: ' . . . '}});

The Validatable.validatesNumericalityOf method of some embodiments includes the following arguments and options:

| Arguments | | |
|---|---|---|
| Name | Type | Description |
| propertyName | String | Property name to validate. |
| Options | Object | |

| Options | | |
|---|---|---|
| Name | Type | Description |
| int | Boolean | If true, then property must be an integer to be valid. |
| message | Object | Optional object with string properties for 'int' for integer validation. Default error messages: - number: is not a number<br>int: is not an integer |

Validatable.validatesInclusionOf method validates the inclusion of a property in a set of values. The method requires a value for property to be in a specified array. For example:

User.validatesInclusionOf('gender', {in: ['male', 'female']}), validates the gender to be either male or female.

User.validatesInclusionOf('role', {in: ['admin', 'moderator', 'user'], message: 'is not allowed'}), validates that the user be an admin, moderator, or user, or else returns the error message "is not allowed."

The Validatable.validatesInclusionOf method of some embodiments includes the following arguments and options:

| Arguments | | |
|---|---|---|
| Name | Type | Description |
| propertyName | String | Property name to validate. |
| Options | Object | |

| Options | | |
|---|---|---|
| Name | Type | Description |
| in | Array | Array Property must match one of the values in the array to be valid. |
| message | String | Optional error message if property is not valid. Default error message: "is not included in the list". |

Validatable.validatesExclusionOf method validates the exclusion of a property. The method requires a property value not to be in a specified array. For example, Company.validatesExclusionOf('domain', {in: ['www', 'admin']}), validates that domain should not be an admin domain.

The Validatable.validatesExclusionOf method of some embodiments includes the following arguments and options:

| Arguments | | |
|---|---|---|
| Name | Type | Description |
| propertyName | String | Property name to validate. |
| Options | Object | |

| Options | | |
|---|---|---|
| Name | Type | Description |
| in | Array | Array Property must match one of the values in the array to be valid. |
| message | String | Optional error message if property is not valid. Default error message: "is reserved". |

Validatable.validatesFormatOf method validates the format of a property. The method requires a model to include a property that matches the given format. An example for this method is: User.validatesFormat('name', {with: /\w+/}).

The Validatable.validatesFormatOf method of some embodiments includes the following arguments and options:

| Arguments | | |
|---|---|---|
| Name | Type | Description |
| propertyName | String | Property name to validate. |
| Options | Object | |

| Options | | |
|---|---|---|
| Name | Type | Description |
| with | RegExp | Regular expression to validate format. |
| message | String | Optional error message if property is not valid. Default error message: " is invalid". |

Validatable.validate method validates properties using a custom validator. The default error message that this method returns in some embodiments is "is invalid." Below is an example of using this validation method:

```
User.validate('name', customValidator, {message: 'Bad name'});
  function customValidator(err) {
    if (this.name === 'bad') err( );
});
var user = new User({name: 'Peter'});
user.isValid( ); // true
user.name = 'bad';
user.isValid( ); // false
```

Validatable.validateAsync method validates properties using a custom async validator. The default error message that this method returns in some embodiments is "is invalid." Below is an example of using this validation method:

```
User.validateAsync('name', customValidator, {message: 'Bad name'});
  function customValidator(err, done) {
    process.nextTick(function ( ) {
      if (this.name === 'bad') err( );
      done( );
    });
});
var user = new User({name: 'Peter'});
user.isValid( ); // false (because async validation setup)
user.isValid(function (isValid) {
  isValid; // true
})
user.name = 'bad';
user.isValid( ); // false
user.isValid(function (isValid) {
  isValid; // false
})
```

Validatable.validatesUniquenessOf method validates uniqueness. In other words, this method ensures that the value of the property is unique in a collection of models. Below is an example of using this validation method:

```
// The login must be unique across all User instances.
User.validatesUniquenessOf('login');
// Assuming SiteUser.belongsTo(Site)
// The login must be unique within each Site.
SiteUser.validateUniquenessOf('login', { scopedTo: ['siteId'] });
```

The Validatable.validatesUniquenessOf method of some embodiments includes the following arguments and options:

| Arguments | | |
|---|---|---|
| Name | Type | Description |
| propertyName | String | Property name to validate. |
| Options | Object | |

| Options | | |
|---|---|---|
| Name | Type | Description |
| with | RegExp | Regular expression to validate format. |
| scopedTo | Array.<String> | List of properties defining the scope. |
| message | String | Optional error message if property is not valid. Default error message: "is not unique". |

Validatable.isValid(callback) method performs validation and triggers validation hooks in some embodiments. In some embodiments, before validation, the obj.errors collection is cleaned. Each validation then can add new errors to obj.errors collection. If collection is not blank, validation has failed. In some embodiments, this method can be called as synchronous only when no asynchronous validation is configured. Below is an example of using this validation method:

```
ExpressJS controller: render user if valid, show flash otherwise
user.isValid(function (valid) {
  if (valid) res.render({user: user});
  else res.flash('error', 'User is not valid'), console.log(user.errors),
    res.redirect('/users');
});
```

Another example:

```
user.isValid(function (valid) {
    if (!valid) {
        console.log(user.errors);
        // => hash of errors
        // => {
        // => username: [errmessage, errmessage, ...],
        // => email: ...
        // => }
    }
});
```

The validatable.isValid(callback) method of some embodiments includes the following arguments and returns:

Arguments

| Name | Type | Description |
| --- | --- | --- |
| callback | Function | called with (valid) |

Returns

| Name | Type | Description |
| --- | --- | --- |
| result | Boolean | True if no asynchronouse validation is configured and all properties pass validation. |

ValidationError( ) method is raised when the application attempts to save an invalid model instance. Below is an example of using this validation method:

```
{
    "name": "ValidationError",
    "status": 422,
    "message": "The Model instance is not valid. \
See `details` property of the error object for more info.",
    "statusCode": 422,
    "details": {
        "context": "user",
        "codes": {
            "password": [
                "presence"
            ],
            "email": [
                "uniqueness"
            ]
        },
        "messages": {
            "password": [
                "can't be blank"
            ],
            "email": [
                "Email already exists"
            ]
        }
    }
}
```

A developer might run into situations the developer needs to raise a validation error and not rely on the system to raise the ValidationError( ). An example of such a situation is in a "before" hook or a custom model method. Below is an example of rasing this method manually:

```
MyModel.prototype.preflight = function(changes, callback) {
    // Update properties, do not save to db
    for (var key in changes) {
        model[key] = changes[key];
    }
    if (model.isValid( )) {
        return callback(null, { success: true });
    }
    // This line shows how to create a ValidationError
    err = new ValidationError(model);
    callback(err);
}
```

Figure 4:
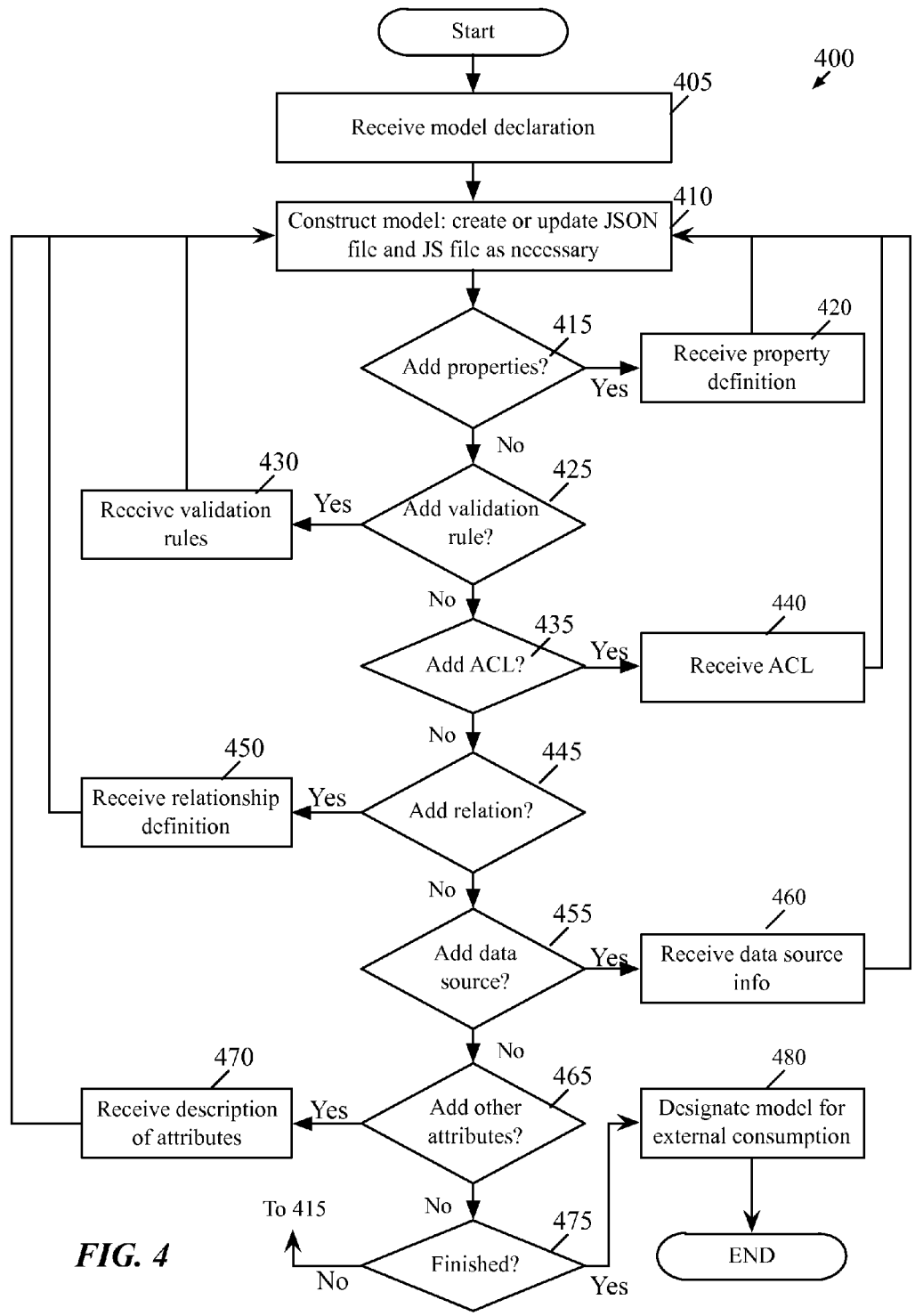
FIG. 4 presents a process that conceptually illustrates how a JavaScript model is defined in some embodiments of the invention.

FIG. 4 presents a process 400 that conceptually illustrates how a JavaScript model is defined in some embodiments of the invention. One of ordinary skill will realize that the operations illustrated in this figure can be performed in any variety of orders that differ from the order illustrated in this figure. The operational order is simply one order for performing these operations.

As shown, the process 400 initially receives (at 405) a declaration of the model. In some embodiments, the model is declared when a developer first names the model. Next, at 410, the process constructs the model by defining a JSON file and a JS file for the model. In some embodiments, the process only defines a JSON file (at 410) when the model is initially constructed. After the core model is constructed, the model in some embodiments can be designated as "common" or "abstract," and then further sub-classed to client versus server, in order to achieve isomorphic capabilities from the beginning After 410, the process determines (at 415) whether the user has requested the addition of a property to the JS model. If so, the process transitions to 420 to receive the property definition, and then transitions back to 410 to update the model's JSON file and/or JS file based on the received property definition. Several examples of adding properties to a model will be provided below. When the process determines (at 415) that the user has not requested that a property be added to the JS model, the process transitions to 425.

At 425, the process determines whether the user has requested the addition of a validation rule(s) to the JS model. If so, the process transitions to 430 to receive the validation rule(s) definition, and then transitions back to 410 to update the model's JSON file and/or JS file based on the received validation definition. Several examples of adding validation rules to a model were provided above, and will be further described below. When the process determines (at 425) that the user has not requested the addition of a validation rule to the JS model, the process transitions to 435.

At 435, the process determines whether the user has requested the addition of the ACL rule(s) to the JS model. If so, the process transitions to 440 to receive the ACL rule(s) definition, and then transitions back to 410 to update the model's JSON file and/or JS file based on the received ACL definition. Several examples of adding ACL rules to a model were provided above, and will be further described below. When the process determines (at 435) that the user has not requested the addition of an ACL rule to the JS model, the process transitions to 445.

At 445, the process determines whether the user has requested the addition of a relations key to the JS model. If so, the process transitions to 450 to receive the relations key, and then transitions back to 410 to update the model's JSON file and/or JS file based on the received relations key. Several examples of adding relations rules to a model were provided above, and will be further described below. When the process determines (at 445) that the user has not requested the addition of a relations rule to the JS model, the process transitions to 455.

At 455, the process determines whether the user has requested that the model be attached to a data source abstractor. As mentioned above, the data source abstractor in some embodiments enables a model to access and modify data in backend storages, such as a relational database. The data source abstractor encapsulates business logic to exchange data between models and various backend systems such as relational databases, REST APIs, SOAP web services, storage services, etc. Data source abstractors, in some embodiments, provide CRUD functions for backend data storages. As mentioned above, the data source abstractors connect the models to the data storages by using data storage connectors that are extensible and customizable. In some of these embodiments, the application code does not use a connector directly. Instead, the data source abstractor class provides an API to configure the underlying connector.

When the process determines (at 455) that the user wishes to attach the model to a data source abstractor, the process transitions to 460 to receive the data source abstractor information, and then transitions back to 410 to update the model's JSON file and/or JS file based on the received data. Several examples of attaching a model to a data source abstractor will be described below. When the process determines (at 455) that the user has not requested the attachment of the model to a data source abstractor, the process transitions to 465.

At 465, the process determines whether the user has requested the addition or modification of any other JS model attribute. Examples of such attributes include options, scopes, and indexes keys, which were described above. When the process determines (at 465) that the user has requested the addition or modification of a JS model attribute, it transitions to 470 to receive the attribute description, and then transitions back to 410 to update the model's JSON file and/or JS file based on the received attribute description. Otherwise, the process transitions to 475 to determine whether the user has finished defining the model.

When the user has not finished defining the model, the process returns to 415 to process additional user input. Otherwise, the process designates (at 480) the constructed JS model as a remotely-accessible model that can be accessed on the server by one or more other devices (e.g., client devices or severs), e.g., through a set of API requests. The process then ends. It should be noted that not all models that are created through a process like the process 400, are designated for remote access in some embodiments. Such models can be created so that they can just be accessed locally on the server or locally on a client.

As mentioned above, a developer can order the operations illustrated in FIG. 4 in any number of arbitrary sequences, after performing operations 405 and 410 initially. Also, none of the operations following 410 are mandatory. As further described below, these operations can be done through a model generator of a framework, or they can be performed programmatically through the framework's API dynamically and on demand. The Appendix B portion of the incorporated ASCII text file computer program listing appendix provides the source code of a portion of the framework of some embodiments for defining JSON-based models.

Figure 5:
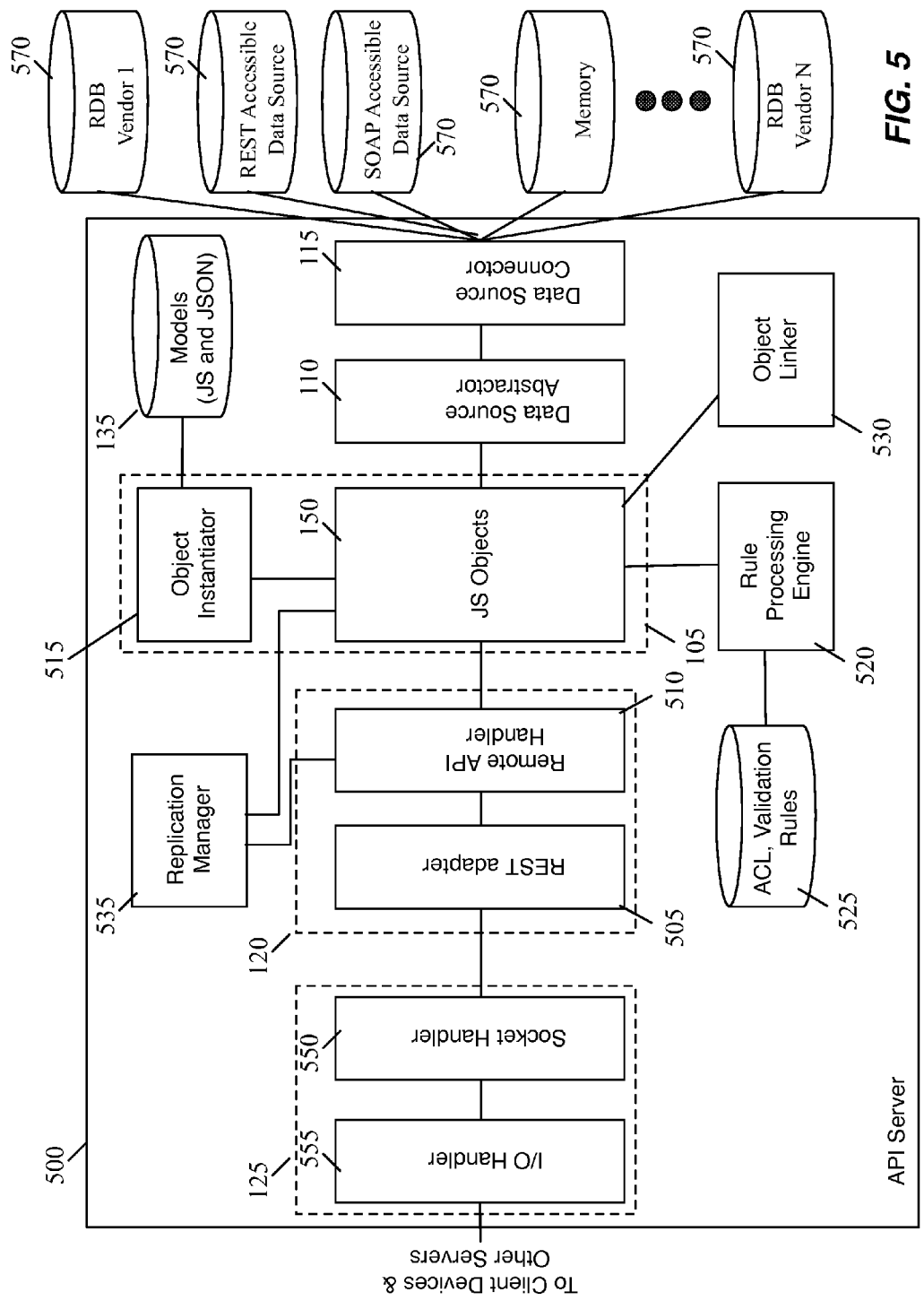
FIG. 5 illustrates a more-detailed view of a JavaScript API server of some embodiments of the invention.

FIG. 5 illustrates a more-detailed view of a JavaScript API server 500 of some embodiments of the invention. This server can process API requests from a variety of devices, such as smartphones, tablets, client computers (e.g., laptops, desktops, etc.), server computers, and other devices. This server is similar to the server 100 of FIG. 1. Like the server 100, the server 500 includes a runtime processor 105, a data abstractor 110, a data storage connector 115, an API handler 120, and an I/O manager 125. Also, like server 100, the API server 500 stores the description of multiple JavaScript models 135, with each model defined in terms of a JavaScript file and a JSON file. In FIG. 5, the API handler 120 is shown to include a REST adapter 505 and a remote API handler 510, while the I/O manager 125 is shown to include a socket handler 550 and an I/O handler 555. Similarly, the runtime processor 105 is shown to include object instantiator 515. Lastly, the API server 500 is shown to include a rule processing engine 520, ACL/Validation rule data storage 525, object linker 530, and a replication manager 535.

The runtime processor 105 in some embodiments instantiates a JavaScript object 150 for each model based on the object's description that is contained in its associated JavaScript model (i.e., its associated JaveScript file and JSON file). Once instantiated, the JavaScript object can be used to process API requests from client devices of the API server. To process API requests, the JS object might have to exchange data with one or more backend data storages 570. As before, JS objects exchange data with backend data storages through the data source abstractor 110 and connector 115, which, as mentioned above, allow the JS objects to exchange data with a variety of data storages, such as relational databases from different vendors, REST accessible data storages, SOAP accessible data storages, server memory, etc. JS objects also connect to the replication manager 535, which connects with replication managers on other servers and client devices. Through these replication managers the data that is stored in the JS objects or stored in storages for these objects can be synchronized between different servers and devices.

While instantiating the objects, the runtime processor 105 also processes the validation, ACL, and relationship attributes that are defined in the JSON files associated with the objects. This processing is different in different embodiments. In some embodiments, this processing simply entails storing the ACL, validation, and relations attributes in data storages (e.g., data storage 525), so that the rule processing engine 520 and object linker 530 can use these attributes to perform their operations. Each time that an object with validation and/or ACL rules receives an API request, the rule processing engine 520 of some embodiments performs the validation and ACL rule check for the object before or after the object processes data in response to this request. Each time an object that has relations key is instantiated, the object linker 530 creates a link between the object and other objects related to it based on relations key values.

In other embodiments, to process the validation, ACL and/or relationship attributes during a particular object's instantiation, the runtime processor instantiates a validator, ACL-rule processor, and/or an object linker for the particular object. The object linker then defines the relationships between the particular object and other objects based on the particular object's relations key values. Each time that the particular object receives an API request, the object uses its validator and/or ACL rule processor to process the validation rule(s) and/or ACL rule(s) for the particular object before or after the object processes data in response to this request. In this manner, the validator and ACL rule processor are modules that are hooked into the particular object.

The I/O handler 555 in some embodiments allows the API server to handle a large number of concurrent sessions with a large number of devices (e.g., computers, mobile devices, etc.). For instance, in some embodiments, this handler 555 uses a non-blocking input/output (I/O) process that can concurrently maintain a large number of concurrent sessions. The I/O process of some embodiments is a single-threaded process that does not consume too much of the system resources, which, in turn allows it to be able to handle a large number of concurrent sessions. In some embodiments, the socket handler 550 can also maintain a session with a connecting device (e.g., a connecting mobile device) for a long duration of time. For example, in some embodiments, the I/O manager 125 can maintain a session for a long duration because it uses a web socket manager to manage the connection session.

The API handler 120 exposes the API server's JS objects 150 to the other devices (e.g., other servers, computers, mobile devices, etc.). As shown, the handler 120 uses REST adapter to expose the APIs to the JS objects. The REST adapter handles the task of processing API requests that are received through REST web services, converting received requests to a format for the API handler 510 to process, and converting the API responses that it receives from the API handler 510 to REST web service format for transmission back to the client devices. Other embodiments expose the APIs through other services, and hence use other API protocol processors. Accordingly, in these embodiments, the REST processor is replaced with a protocol processor. This protocol processor in some embodiments can switch protocols dynamically between REST and other formats like websockets, SOAP, webrtc, etc.

As mentioned above, client devices in some embodiments instantiate objects and use these objects to process API requests locally or to direct these API requests to JS objects on an API server. In some embodiments, the client devices store the models and instantiate the objects from these models. The objects on the client devices are referred to as proxy objects, as they act on the client as proxies of the objects on the server. In some embodiments, the proxy objects are JS objects, while in other embodiments, the proxy objects are other types of objects (e.g., a Java object or an objective C object). For instance, in some embodiments, a mobile application executes within a browser on a client device, while another mobile application executes natively on top of the operating system (OS) of the client device. In some of these embodiments, the applications that execute within the browser, execute on top of the browser's JS engine. Hence, in these embodiments, the proxy objects can be JS objects. On the other hand, the application that runs natively on the device's OS, instantiates other types of proxy objects (e.g., Java objects or objective C objects) in some embodiments.

The asynchronous nature of the JavaScript poses unique challenges for traceability and debugging when programming APIs. In some embodiments the API server introduces a new construct called a zone. A zone is a special function that allows parallel execution of statements within function. The parallel execution allows for scope to be controlled and spawned independently. The function will not return a result until all statements have completed in its operation. The statement execution can be traced across the asynchronous callback boundaries within JavaScript so that each asynchronous function can be traced back to its calling parent. In addition, each functional call can carry context in the form of global data. The global data for each statement can be aggregated to the parent zone function and returned as part of the result set.

The API server uses a zone as a means to service API requests and responses across the entire lifecycle of the API invocation. This means that the zone can carry contextual information passed by the caller and have it propagaged throughout all functional boundaries invoked within the API. The same zone can carry contextual information from a responding source back to the API requester as well accordingly.

Figure 6:
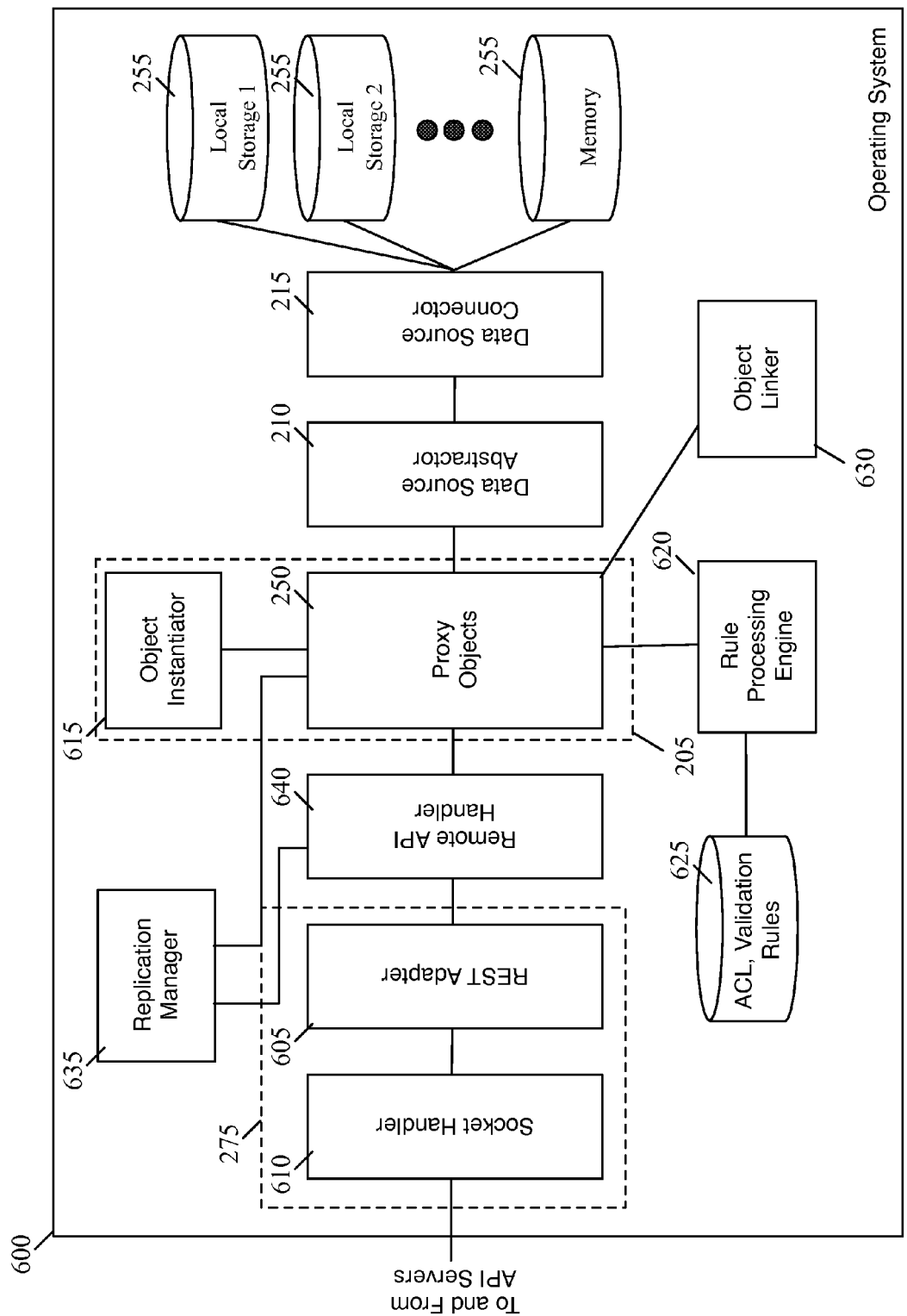
FIG. 6 conceptually illustrates executing proxy objects of some embodiments in a native OS environment of a client device.
Figure 7:
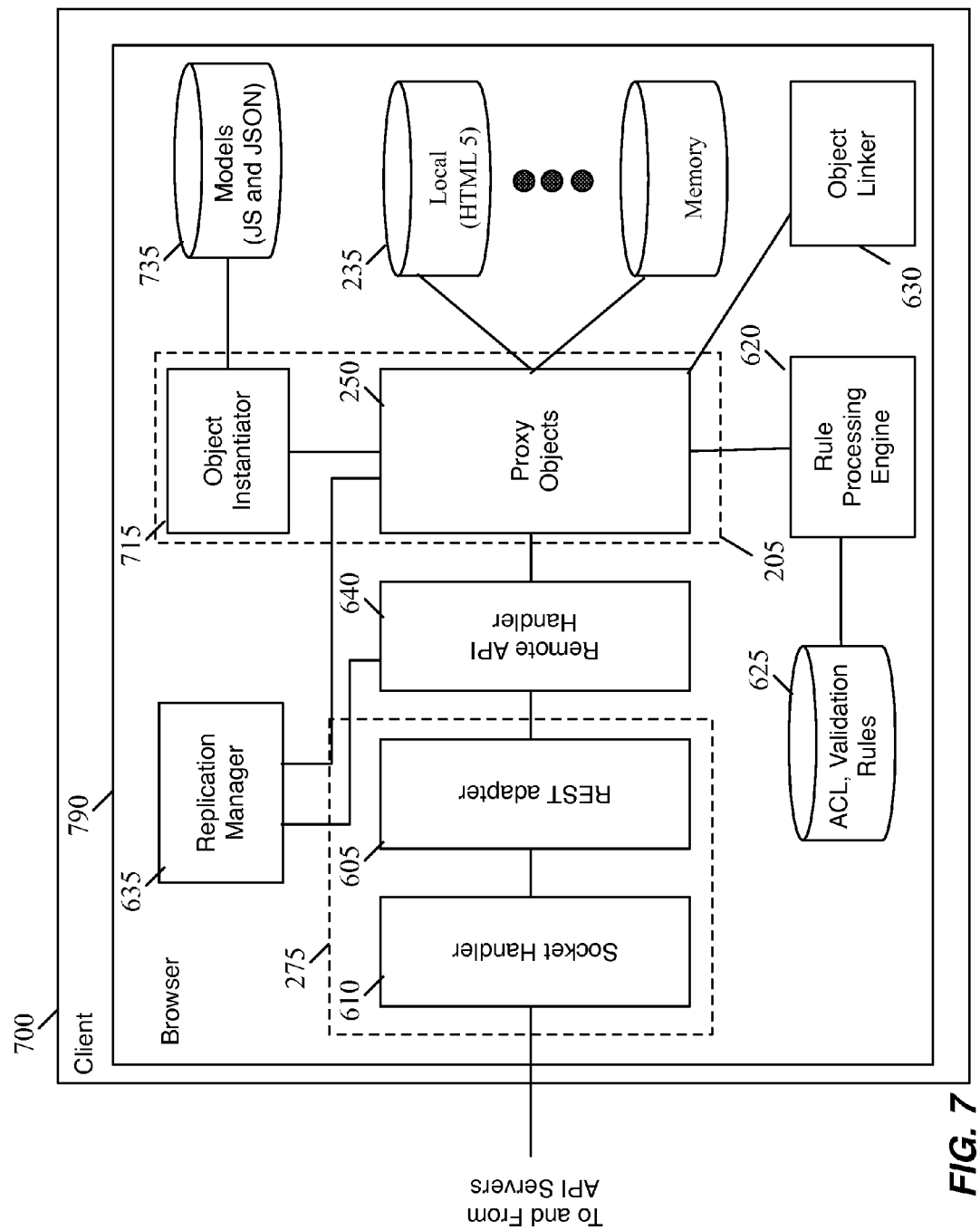
FIG. 7 conceptually illustrates executing the JS models of some embodiments within a web browser that executes on a client device.

FIGS. 6 and 7 present block diagrams that describe how the models of some embodiments can operate respectively within the browser environment and within the native OS environment of a client device. FIG. 6 conceptually illustrates executing proxy objects of some embodiments in a native OS environment of a client device 600. This environment is similar to the client environment of FIG. 2. Like the client 200, the client 600 includes a runtime processor 205, a data abstractor 210, a data storage connector 215, a server interface 275. In FIG. 6, the server interface 275 is shown to include a REST adapter 605 and a socket handler 610. Similarly, the runtime processor 205 is shown to include object instantiator 615 as well as proxy objects 250 that are created by the instantiator. Lastly, the client device 600 is shown to include a rule processing engine 620, ACL/Validation rule data storage 625, object linker 630, a replication manager 635, and a remote API handler 640.

The runtime processor 205 instantiates several proxy objects 250 that correspond to JS objects running on the API server. In some embodiments, the proxy objects are objects that can be processed in the native OS environment. Examples of such proxy objects include objective C object (e.g., for Apple iOS environment) and Java objects (e.g., for Android environment). To instantiate these proxy objects, the client device includes an adapter that can query the API server dynamically at runtime for an object description, and then, based on the received object description, instantiate a native object (e.g., as objective C objects in iOS and as Java objects in Android). In some embodiments, this adapter is part of the REST adapter 605, which acts as a bridge between client and the server. The Appendix C portion of the incorporated ASCII text file computer program listing appendix provides the source code for an adapter of some embodiments that can be used in a native client environment to pull an object's description from a server.

In some embodiments, the client device dynamically queries the API server (through the above-described adapter) for an object description when it receives an API request that it does not know how to handle. The API server in these embodiments then notes the type of client device that is making the query (i.e., notes the operating system of the client device) and then provides the object description to the client device. Once the native object is instantiated on the client, the native client can then process the API request locally, or it can direct the API request to be processed remotely by the server. In some embodiments, the API server can provide the response to the API request with the provided object description or before providing this object description.

As mentioned above, once instantiated, a proxy object 250 on the client can be used to process an API request from local data storages 255 that reside on the client device 200, or by calling a corresponding JS object that resides on the API server 100 so that this object 280 can process this request (e.g., by using backend data storages). As shown, the proxy objects 250 access the local data storages 255 through the data abstractor 210 and the data connector 215, which were described above. In some embodiments, the data abstractor 210 and the data connector 215 are not used in the native client-side environment as the proxy objects can pull data directly from the client's local data storages without going through the data abstraction and connection layers.

The proxy object 250 accesses its corresponding JS object 280 on the API server through the remote API handler 640, the REST adapter 605, and socket handler 610. The API handler 640 is part of the client-side framework that allows the proxy objects to send out API requests to the API server and to receive responses to the API requests from the API server. In some embodiments, this handler dynamically determines whether the object's API request should be processed remotely or locally. This dynamic determination is based on conditions that the handler 640 assesses dynamically in some embodiments. The dynamic decision making of the handler 640 is further described in the concurrently filed U.S. patent application Ser. No. 14/490,633, entitled "Dynamic Determination of Local and Remote API Calls".

The REST adapter 605 establishes REST web services between the client 600 and server 500, in order to allow these two devices to exchange API requests and responses by using the REST defined protocols. In other words, the REST adapter reformats the API requests of the proxy objects 250 to a REST-compliant format for transmission to the API server, and reformats the server's API responses from the REST-compliant format to a JS format that the JS objects can process. As mentioned above, other embodiments use other API protocol processors. The socket handler 610 maintains the communication socket(s) between the client device 600 and the API server 500. In some embodiments, the socket handler 610 establishes web sockets with the socket handler 550 of the API server 500.

While instantiating an object, the runtime processor 205 also processes the validation, ACL, and relationship attributes that are defined in the object's JSON files via the hooks that are inserted in the JS file. This processing is different in different embodiments. In some embodiments, this processing simply entails storing the ACL, validation, and relations attributes in data storages (e.g., data storage 625), so that rule processing engine 620 and object linker 630 can use these attributes to perform their operations. Each time that an object with validation and/or ACL rules receives an API request, the rule processing engine 620 in some embodiments performs the validation and ACL rule checks for the object before or after the object processes data in response to this request. Each time an object that has relations key is instantiated, the object linker 630 creates a link between the object and other objects related to it based on relations key values.

To process the validation, ACL and/or relationship attributes during a particular object's instantiation, the runtime processor of some embodiments instantiates a validator, ACL-rule processor, and/or an object linker for the particular object. The object linker 630 then defines the relationships between the particular object and other objects based on the particular object's relations key values. Each time that the particular object receives an API request, the object uses its validator and/or ACL rule processor 620 to process the validation rule(s) and/or ACL rule(s) for the particular object before or after the object processes data in response to this request. In this manner, the validator and ACL rule processor are modules that are hooked into the particular object. In some embodiments, the validator, rule processor and object linker are modules within the runtime processor. In still other embodiments, the validator and rule processor are simply functions performed by the runtime processor, while the object linker is a separate module with the runtime processor.

As shown in FIG. 6, the JS objects also connect to the replication manager 635, which connects with replication manager on the API server. Through these replication managers, the data that is stored in the JS objects or stored in storages for these objects can be synchronized between different servers and devices.

FIG. 7 conceptually illustrates executing the JS models of some embodiments within a web browser 790 that executes on a client device 700. This environment is similar to the client environment of FIG. 6, except for a few differences. For instance, all the modules illustrated operate within the browser 790. Also, as web browsers typically have a JS engine (e.g., the V8 JS engine), the object instantiator 715 instantiates JS proxy objects, as opposed to the non-JS proxy objects that are instantiated in some embodiments in the native client environments.

As shown in FIG. 7, the client 700 stores the description of multiple JavaScript models 735, with each model defined in terms of a JavaScript file and a JSON file. In some embodiments, the client-side JS and JSON files are identical or similar to the JS and JSON files that are used to define the object on the API server. The object instantiator 715 instantiates each JS, proxy object based on the object description contained in an associated pair of JS file and JSON file. In some embodiments, a JS file and a JSON file are associated through their common name.

In FIG. 7, the proxy objects 250 are shown to directly access the local storage of the browser without having to using the data abstractor 210 or the data connector 215, which were illustrated in FIG. 6 for the native client environment. However, as mentioned above, the native client environment also does not utilize the data abstractor 210 and the data connector 215 in some embodiments.

The framework of some embodiments provides a Zone library that provides a way to represent the dynamic extent of asynchronous calls in JS framework of some embodiments. The zone library dynamically modifies framework's asynchronous APIs at runtime. Similar to how a scope of a function defines where it may be used, the extent of a call represents the lifetime that it is active. The Zone library of some embodiments also provides execution context that can persist across the lifecycle of one or more asynchronous calls. This concept is similar to the concept of thread-local data in Java. In some embodiments, the Zones library provides a way to group and track resources and errors across asynchronous operations. In addition zones (1) enable more effective debugging by providing better stack traces for asynchronous functions, (2) make it easier to write and understand asynchronous functions for the applications, (3) make it easier to handle errors raised asynchronously and avoid resulting resource leaks, and (4) enable the developers to associate user data with asynchronous control flow In some embodiments, in order to use the zones that are provided in the Zone library, the developer should add the "require('zone').enable( )" as the very first line of the developer's program. By doing so, the zone library exports a global variable, zone. The zone global variable always refers to the currently active zone. In some embodiments, the methods that can always be found on the 'zone' object are actually static methods of the Zone class, so they don't do anything with the currently active zone. After loading the zone library, the developer's program has entered the 'root' zone.

Different embodiments provide different ways to create a zone. The canonical way to create a one-off zone is as follows:

```
// Load the library
require('zone').enable( );
// MyZone is the name of this zone which shows up in stack traces.
zone.create(function MyZone( ) {
    // At this point the 'zone' global points at the zone instance ("MyZone")
    // that we just created.
});
```

The above zone constructor function is called synchronously.

A simple way to create a function that is always wrapped within a zone is as follows:

```
function renderTemplate(fileName, cb) {
    zone.create(function( ) {
        // Actual work here
        ...
    }).setCallback(cb);
}
```

To make the above function a little less verbose, some embodiments provide the 'zone.define( )' API. With this API, the developer can wrap a function such that when the function is called a zone is created. For example:

```
var renderTemplate = zone.define(function(fileName, cb) {
    zone.setCallback(cb);
    // Actual work here
    ...
});
```

This zone template now can be used as follows:

```
renderTemplate('bar', function(err, result) {
    if (err)
        throw err;
    // Do something with the result
    ...
});
```

Zones of some embodiments are like asynchronous functions. From the outside perspective, they can return a single value or "throw" a single error. Some embodiments provide a couple of ways for the outside zone to obtain the result of a zone. When a zone reports its outcome, in some embodiments, no more callbacks will run inside the zone. Additionally all non-garbage-collectable resources are cleaned up when a zone reports its outcome. Zones of some embodiments, also automatically exit when no explicit value is returned. One way to obtain the outcome of a zone, in some embodiments, is:

```
require('zone').enable( );
var net = require('net');
zone.create(function MyZone( ) {
    // This runs in the context of MyZone
    net.createConnection(...);
    fs.stat(...);
    if (Math.random( ) < 0.5)
        throw new Error('Chaos monkey!');
    else if (Math.random( ) < 0.5)
        zone.return('Chaos monkey in disguise!');
    else
        ; // Wait for the zone to auto-exit.
}).setCallback(function(err, result) {
    // Here we're back in the root zone.
    // Asynchronicity is guaranteed, even if the zone returns or
    throws immediately.
    // By the time we get here we are sure:
    //   * the connection has been closed one way or another
    //   * fs.stat has completed
});
```

The developer can also use the then and catch methods, as if it were a promise:

```
zone.create(function MyZone( ) {
    // Do whatever
}).then(function(result) {
    // Runs when succesful
}).catch(function(err) {
    // Handle error
});
```

Within a zone, a developer may use resources that are "owned" by ancestor zones. Therefor in some embodiment the following is proper:

```
var server = http.createServer( ).listen(1234);
server.listen(1234);
zone.create(function ServerZone( ) {
    // Yes, allowed.
    server.on('connection', function(req, res) { ... });
    // Totally okay
    process.stdout.write('hello!');
});
```

However, using resources owned by child zones is not allowed:

```
var server;
zone.create(function SomeZone( ) {
    server = http.createServer( ).listen(1234);
});
// NOT OKAY!
server.on('connection', function( ) { ... });
```

Some embodiments allow for a zone to temporarily enter an ancestor zone. Some such embodiments, however, do not allow for the zone to enter child zones, siblings, etc. The rationale behind this is that when a zone is alive its parent must also be alive. Other zones may exit unless they are aware that code will run inside them. An example is illustrated below:

```
zone.create(function OuterZone( ) {
    var childZone = zone.create(function ChildZone( ) {
        ...
    });
    // Fine.
    zone.parent.run(function( ) {
        console.log('Hello from the root zone!');
    });
    // NOT ALLOWED
    childZone.run(function( ) {
        console.log('Weird. This isn't supposed to work!');
    });
});
```

Some embodiments provide the following ways to explicitly exit a zone:
zone.return(value) sets the return value of the zone and starts cleanup.

zone.throw(error) sets the zone to failed state and starts cleanup. zone.throw, itself, does not throw, so statements after it will run.

throw error uses normal exception handling. If the exception is not caught before it reaches the binding layer, the active zone is set to failed state and starts cleanup.

zone.complete(err, value) is a zone-bound function that may be passed to subordinates to let them exit the zone. The following example,

```
zone.create(function StatZone( ) {
    fs.stat('/some/file', function(err, result) {
        if (err)
            throw err;
        else
            zone.return(result);
    });
});
is equivalent to:
zone.create(function StatZone( ) {
    fs.stat('/some/file', zone.complete);
});
```

In some embodiments, in order to run code in a child zone, a developer can use zone.bindCallback and zone.bindAsyncCallback functions to create a callback object which can be invoked from a parent zone. A developer can also, within a zone, use resources that are "owned" by ancestor zones of that zone. Therefore, the following example is proper:

```
var server = http.createServer( ).listen(1234);
server.listen(1234);
```

```
zone.create(function ServerZone( ) {
    // Yes, allowed.
    server.on('connection', function(req, res) { ... });
    // Totally okay
    process.stdout.write('hello!');
});
```

However, using resources owned by child zones is not allowed, therefore the following example is not proper:

```
var server;
zone.create(function SomeZone( ) {
    server = http.createServer( ).listen(1234);
});
// NOT OKAY!
server.on('connection', function( ) { ... });
```

The framework of some embodiments provide a very useful property "prozone.data" which is a property that associates arbitrary data with a zone. This property can be thought as the 'scope' of a zone. Properties that are not explicitly defined within the scope of a zone are inherited from the parent zone. In some embodiments, zone.data equals the global object in the root zone. In these embodiments, zone.data starts off as an empty object with the parent zone's data property as it's prototype in any other zone.

The example provided below shows a very simple case where zones can (1) store user provided data with different lifetimes, (2) capture unexpected Exceptions in asynchronous callbacks, and (3) provide a long stack-trace of exceptions:

```
js require('zone').enable( ); express = require('express'); var Zone = zone.Zone;
var app = express( ); var router = express.Router( ); Zone.longStackSupport = true;
//Initialize the Request id in the root zone. //This value will be available to all child zones.
zone.data.requestId = 0;
app.use(function(req, res, next) { //Increment the request ID for every new request
++zone.data.requestId;
//Create a new Zone for this request zone.create( function RequestZone( ) { //Store the
request URL in the Request zone //This value will be only to this zone and its children
zone.data.requestURL = req.url;
        //Continue to run other express middleware within this child zone
        next( );
    })
    .then(
        //The call was succesful
        function successCallback(err) {
            res.write('Transaction succesful\n');
            res.end( );
        },
        //An error was thrown while processing this request
        function errorCallback(err) {
            res.write('Transaction failed\n');
            res.write('x' + err.zoneStack + '\n');
            res.end( );
        });
});
router.get('/', function(req, res) { if (Math.random( ) > 0.5) { //Simulate some async I/O
call that throws an exception process.nextTick(function( ) { throw new Error("monkey
wrench"); }); }
res.write('Running request #' + zone.data.requestId + ' within zone: ' + zone.name + '
(URL:' + zone.data.requestURL + ')\n'); });
app.use('/', router); app.listen(3001);
```

Some embodiments of the invention provide a JS framework (e.g., like a node.js framework or a node.js like framework) that provides robust and simple tools for specifying class descriptions of objects for processing API requests. In some embodiments, this framework can be used as a server-side framework to define an API server and/or as a framework to define client side applications (e.g., mobile applications). In some embodiments, the framework employs a JavaScript Definition Language (JSDL) that allows a developer to specify JS data models. As mentioned above, a JS data model of some embodiments can be defined in terms of a JS file that specifies the model's behavior and a JSON file that specifies the model's properties. JSDL of some embodiments provides a set of extensions to standard JSON file format that allows a developer to specify a rich set of properties for a JS object that needs to process an API request.

In some embodiments, JSDL allows a developer (e.g., a mobile application developer) to develop an entire set of objects with corresponding APIs by writing the objects entirely in JSON form. Specifically, the framework of some embodiments allows a developer to define a model in a variety of ways, including (1) using a model generator of the framework, (2) a JSON instance introspection capability of the framework, and (3) a database discovery API of the framework.

A simple method of creating a model in some embodiments is through a command line API command that invokes the model generator. When the model generator is invoked, a simple model can be defined by specifying a property definition in a JSON model. Such a property definition can include a set of one or more property key-value pairs, in the form of "propertyName: type element." In this type of definition, the property name is the key and the type of property is the value. An example of a property definition in JSON of some embodiments is as follows:

```
{
    "id": "number",
    "firstName": "string",
    "lastName": "string"
}
```

In this example, the JSON model has three different properties: (1) the property name (i.e., key) "id" which has a property type (i.e., value) of a number, (2) the key "firstName" that has a property value of a string, and (3) the key "lastName" that also has a property value of a string. In other words, each key of some embodiments in the JSON object defines a property in the model and has an associated type. In some embodiments, JSDL provides a number of built-in types, such as string, number, Boolean, array, and object.

Another method of describing the above-described model in some embodiments is by specifying the following JS code:

```
var UserDefinition = {
    id: Number,
    firstName: String,
    lastName: String
}
```

In some embodiments, a new model can also be created by extending a current model. For instance, a developer can extend a model named User to create a new model called Customer. As illustrated in the example below, the model Customer will inherit properties and methods of the model User.

```
var Customer = User.extend('customer',
{
    accountId: String,
    vip: Boolean
});
```

In this example the model Customer has inherited all the properties of the model User and additionally has two more keys that are "accountId" and "vip" with two values string and Boolean respectively.

Some embodiments allow a developer to define a model by mixing its definition with the definition of one or more other models, as illustrated in the following example:

```
var TimeStamp = modelBuilder.define('TimeStamp', {created: Date, modified: Date});
var Group = modelBuilder.define('Group', {groups: [String]});
User.mixin(Group, TimeStamp);
```

In this example, the User model is a mix of the Group and TimeStamp models.

To create a model, the model generator of some embodiments allows a developer to add properties, control logic rules, relationships, and data sources to the model, and to expose the model to APIs from remote locations (e.g., from client devices and other servers). These operations will be briefly described below. These operations will also be further elaborated below after discussing model creation through database schema discovery and through instance introspection.

The following example illustrates a framework's command line controls for defining a model and adding properties to the model. In this and other examples below, the framework is called loopback. Also, in this example, the model being created is called book. This model represents a book database. To create this model, the developer can enter the following command: $ slc loopback:model book. The developer is then prompted to choose the data source to which the model will connect. By default, the model generator of some embodiments will only list the in-memory data source (named "db" in this example), as follows:

```
[?] Select the data-source to attach book to: (Use arrow keys)
> db
```

As further described below, other data source options will be displayed at this stage when the developer creates additional data sources.

If the developer presses RETURN after being presented with the in-memory data source db the model will be connected to this data source. Next, the generator will ask:
[?] Expose book via the REST API? (Y/n),
and the developer will have to enter Y or N to indicate respectively that the created model should or should not be exposed to remote access through REST web services.

Next, the developer can add properties to a model through the command $ slc loopback:property. The invocation of this command will then prompt developer (1) to select from models in the application, to which it will add new property, (2) to enter the name of the property to add, (3) to select the data type of the property, and (4) to specify whether the property is required. The command-line interface during this sequence of operations is as follows in some embodiments:

```
$ slc loopback:property
[?] Select the model: inventory
[?] Enter the property name: price
[?] Property type: (Use arrow keys)
    string
  > number
    boolean
    object
    array
    date
    buffer
    geopoint
    (other)
```

After each property is added to the book model, pressing RETURN will accept the default type (which is string in some embodiments) for each property. If another type should be specified, the developer has to chose the desired type. Once the developer is done entering the model properties, the model generator presents a list of properties and their types, and prompts the developer to specify request the construction of this model, as follows:

```
Done defining model book (books).
    title (string)
    author (string)
    description (string)
    totalPages (number)
    genre (string)
Create this model? (yes):
```

One example of a developer using the model generator to create a new model in an existing application is as follows. This process starts through a command line input:

```
$ cd <loopback-app-dir>
$ slc loopback:model [model-name]
```

In this example, model-name is the name of the model the developer wishes to create (optional on command line). The model generator will then prompt the developer for model name, if supplied a name on the command-line, the developer is required to just press Enter to use it. By default, only the memory connector data source exists.

The developer, however, can add additional data sources by using the framework's data source generator. This data source generator can be invoked by a command $ slc loopback:datasource [name]. In response, the data source generator will prompt the developer (1) to enter the name of the new data source (when the developer supplied a name on the command-line, the developer can just press Enter to use it), and (2) to select the connector to use for the data source. One example of this invocation is as follows:

```
$ slc loopback:datasource
[?] Enter the data-source name: corp2
[?] Select the connector for corp2: (Use arrow keys)
    other
  > In-memory db
    MySQL
    PostgreSQL
    Oracle
    Microsoft SQL
    MongoDB
```

```
    SOAP webservices
    REST services
    Neo4j
    Kafka
```

If the created model is exposed over REST, then all the standard create, read, update, and delete (CRUD) operations are available via REST endpoints. The developer, in some embodiments, can also add developer's own custom remote methods that can be called via REST operations.

As mentioned above, some embodiments provide various ways for creating a model. In some embodiments, these various ways depend on the kind of data source on which the model is based. For instance, in addition to the above-described model generator, the framework of some embodiments allows a developer to build (1) a dynamic model for free-form data by using instance introspection of JSON data (e.g., from NoSQL databases or REST APIs), and (2) a static, schema-driven model by using a database discovery API (e.g., for discovering the schema of an RDB).

An example of creating a dynamic model by using instance introspection when the data does not have a schema is as follows:

```
var ds = require('../data-sources/db.js')('memory');
// Instance JSON document
var user = {
    name: 'Joe',
    age: 30,
    birthday: new Date( ),
    vip: true,
    address: {
        street: '1 Main St',
        city: 'San Jose',
        state: 'CA',
        zipcode: '95131',
        country: 'US'
    },
    friends: ['John', 'Mary'],
    emails: [
        {label: 'work', id: 'x@sample.com'},
        {label: 'home', id: 'x@home.com'}
    ],
    tags: [ ]
};
// Create a model from the user instance
var User = ds.buildModelFromInstance('User', user, {idInjection: true});
// Use the model for CRUD
var obj = new User(user);
console.log(obj.toObject( ));
User.create(user, function (err, u1) {
    console.log('Created: ', u1.toObject( ));
    User.findById(u1.id, function (err, u2) {
        console.log('Found: ', u2.toObject( ));
    });
});
```

Unlike dynamic models, a developer can define static models for models with schema definitions (e.g., RDB). The developer can create static models using framework's discovery API by consuming existing data from a relational database. The developer then can keep the static model synchronized with the database using framework's schema/model synchronization API.

The following example illustrates how a developer can create a model that is associated with an Oracle RDB.

```
var loopback = require('loopback');
var ds = loopback.createDataSource('oracle', {
    "host": "demo.strongloop.com",
    "port": 1521,
    "database": "XE",
    "username": "demo",
    "password": "L00pBack"
});
// Discover and build models from INVENTORY table
ds.discoverAndBuildModels('INVENTORY', {visited: { }, associations:
true}, function (err, models) {
    // Now we have a list of models keyed by the model name
    // Find the first record from the inventory
    models.Inventory.findOne({ }, function (err, inv) {
        if(err) {
            console.error(err);
            return;
        }
        console.log("\nInventory: ", inv);
        // Navigate to the product model
        inv.product(function (err, prod) {
            console.log("\nProduct: ", prod);
            console.log("\n ------------ ");
        });
    });
});
```

This example shows that for an Oracle database, a developer can first, write a code that sets up the Oracle data source. The developer can then call to a discoverAndBuildModels( ) function (in the framework's discovery API set) to create models from the database tables. Calling it with the "associations: true" option makes the discovery follow primary/foreign key relations. The codeless creation of APIs by using the RDB schema discovery methodology of some embodiments of the invention is further described in the concurrently filed U.S. patent application Ser. No. 14/490,651, entitled "Codeless Generation of APIs,", which is incorporated herein by reference.

The data source connectors of some embodiments provide discovery capability so that the developer can use Data-Source to discover model definitions from existing database schema. The following exemplary APIs enable UI or code to discover database schema definitions that can be used to build models in some embodiments.

```
// List database tables and/or views
ds.discoverModelDefinitions({views: true, limit: 20}, cb);
// List database columns for a given table/view
ds.discoverModelProperties('PRODUCT', cb);
ds.discoverModelProperties('INVENTORY_VIEW', {owner:
'STRONGLOOP'}, cb);
// List primary keys for a given table
ds.discoverPrimaryKeys('INVENTORY', cb);
// List foreign keys for a given table
ds.discoverForeignKeys('INVENTORY', cb);
// List foreign keys that reference the primary key of the given table
ds.discoverExportedForeignKeys('PRODUCT', cb);
// Create a model definition by discovering the given table
ds.discoverSchema(table, {owner: 'STRONGLOOP'}, cb);
```

In addition to discoverAndBuildModels which discovers and builds models from the specified owner/modelName, the other functions for discovering other properties or elements of a data source include: (1) discoverModelDefinitions( ) to discover model definitions (table or collection names), based on tables or collections in a data source; (2) discoverModelProperties( ) to discover metadata on columns (properties) of a DB table; (3) discoverPrimaryKeys( ) to discover primary key definitions in a database; (4) discoverForeignKeys( ) to discover foreign key definitions from a database; (5) discoverExportedForeignKeys( ) to discover foreign key definitions that are exported from a database; and (6) discoverSchema( ) to discover JSDL models from a database.

As mentioned before, a developer can make a model extend or "inherit from" an existing model that is either one of the built-in models (such as User), or a custom model that the developer has defined in his/her application. For instance, to extend a model with JSON, a developer can first use the model generator to create a new model in the application. In some embodiments, this will create a JSON file in the /common/models directory (e.g., for a customer model, customer.json). The developer can edit this file and set the "base" property in the JSON file to the name of the model the developer wishes to extend, which is either one of the built-in models, or one of the custom models that the developer defined in the application. For example, here is an excerpt from the customer.json file that extends the built-in User model to define a new Customer model: customer.json

```
{
    "name": "Customer",
    "base": "User",
    "idInjection": false,
    ...
```

A developer can also create custom models that extend from a single base custom model. For example, to define a model called MyModel that extends from a custom model that the developer has previously defined and called MyBaseModel, the developer can first create MyModel using slc loopback:model. The developer can then edit the JSON file common/models/MyModel.json as follows:

```
{
    "name": "MyModel",
    "base": "MyBaseModel",
}
```

The developer can also add new properties to the JSON file after the developer has extended the model, for example:

```
{
    "name": "Customer",
    "base": "User",
    "properties": {
        "favoriteMovie": {
            "type": "string"
        }
    }
}
```

To extend a model programmatically, the developer, in some embodiments, can create a JS file with exactly the same base name as the model JSON file. As described before, JS and JSON files that are commonly named are associated together to define a model in some embodiments. For example, if the customer model is defined in customer.json, then the developer can create customer.js. Both of these files must be in the /common/models directory. After creating the JSON file, the developer can extend a model programmatically with the extend( ) method. The method's signature is: newModel=modeName.extend('modelName', properties [, settings]), where:

newModel is the name of the new model the developer is defining.

modelName is the name of the model the developer is extending.

properties is a JSON object defining the properties to add to the model.

settings is an optional JSON object defining other options such as relations, ACLs, and so on.

To attach a model to a data source, some embodiments of the invention use data source abstractors and connectors. As mentioned above, a data source abstractor enables a model to access and modify data in backend systems. The abstractor encapsulates business logic to exchange data between models and various backend systems (such as relational databases, REST APIs, SOAP web services, storage services, etc). Data source abstractors generally provide create, retrieve, update, and delete (CRUD) functions in some embodiments.

In some embodiments, models access data sources not only through the abstractors but also through data source connectors, which are extensible and customizable. In general, application code does not use a connector directly. Rather, the data source abstractor provides an API to configure the underlying connector. By default, slc (i.e., the command line API) creates and uses the memory connector, which is suitable for development. To use a different data source, the developer can use slc loopaback:datasource to create the new data source and add it to the application's datasources.json. The developer then can edit datasources.json to add the appropriate credentials for the data source. Next, the developer can create a model to connect to the data source or modify an existing model definition to use the connector.

For example, to add a new data source, in some embodiments, the developer can use the data source generator: $ slc loopback:datasource. The system will prompt the developer for the name of the new data source and the connector to use; for example, MySQL, Oracle, REST, and so on. The tool will then add an entry such as the following to datasources.json:

```
...
"corp1": {
    "name": "corp1",
    "connector": "mysql"
}
...
```

The above example creates a MySQL data source called "corp1". The identifier determines the name by which the developer refers to the data source and can be any string. Now the developer can add data source credentials. For example, the developer can edit datasources.json to add the necessary authentication credentials for the data source, which is typically the hostname, username, password, and database name. For example:

```
"corp1": {
    "name": "corp1",
    "connector": "mysql",
    "host": "the userr-mysql-server. foo.com",
    "user": "db-username",
    "password": "db-password",
    "database": "the userr-db-name"
}
```

To make the model use the data source, the developer can edit the JSON file to set the data source used by a model:

```
"model-name": {
  "properties" : {
    ...
  }
  "dataSource": "datasource-name",
  ...
}
```

For example, using the previous example where the data source was named "mysql," the developer can edit the "books" data source, to change the "dataSource" property from "db" to "corp1" to use the corresponding MySQL database:

```
"book": {
    "properties": {
      ...
    },
    "public": true,
    "dataSource": "corp1",
    "plural": "books"
}
```

Then the books model would use the "corp1" data source that uses the MySQL connector instead of the "db" data source that uses the memory connector.

In some embodiments the following connectors are available for a developer:

| Connector | Module | Installation |
| --- | --- | --- |
| Memory connector | Built in to LoopBack | Not required |
| Email | Built in to LoopBack | Not required |
| MongoDB | loopback-connector-mongodb | npm install—save loopback-connector-mongodb |
| MySQL | loopback-connector-mysql | npm install—save loopback-connector-mysql |
| Oracle | loopback-connector-oracle | npm install—save loopback-connector-oracle |
| PostgreSQL | loopback-connector-postgresql | npm install—save loopback-connector-postgresql |
| REST | loopback-connector-rest | npm install—save loopback-connector-rest |
| SOAP | loopback-connector-soap | npm install—save loopback-connector-soap |
| SQL Server | loopback-connector-mssql | npm install—save loopback-connector-mssql |

To install a connector, the developer can run JS package install and then save, for the connector module to add the dependency to package.json; for example:

```
...
"dependencies": {
    "loopback-connector-oracle": "latest"
}
...
```

In order to create a data source in some embodiments, the developer can use the data source generator to create a new data source or create a data source programmatically. The data source properties of some embodiments depend on the specific data source being used. However, data sources for database connectors (e.g., Oracle, MySQL, PostgreSQL, MongoDB, etc.) in some embodiments share a common set of properties, as described in the following table:

| Property | Type | Description |
| --- | --- | --- |
| connector | String | Connector name; one of:<br>"memory"<br>"loopback-connector-mongodb" or "mongodb"<br>"loopback-connector-mysql" or "mysql"<br>"loopback-connector-oracle" or "oracle"<br>"loopback-connector-postgresql" or "postgresql"<br>"loopback-connector-rest" or "rest"<br>"loopback-connector-mssql" or "mssql" |
| database | String | Database name |
| debug | Boolean | If true, turn on verbose mode to debug database queries and lifecycle. |
| host | String | Database host name |
| password | String | Password to connect to database |
| port | Number | Database TCP port |
| username | String | Username to connect to database |

As discussed before, some embodiments expose models over a REST API. In some embodiments, the framework automatically binds a model to a list of HTTP endpoints that provide REST APIs for model instance data manipulations (e.g., through CRUD operations) and other remote operations. By default, the REST APIs are mounted to the plural of the model name. For example, if the developer has a location model, it is mounted to /locations. By default, scaffolded applications expose models over REST using the loopback.rest router:

```
var app = loopback( );
app.use(loopback.rest( ));
// Expose the 'Product' model
app.model(Product);
```

After running the above codes, the developer will have the Product model with create, read, update, and delete (CRUD) functions working remotely from mobile clients. At this point, the model is schema-less and the data are not checked. The developer can then view generated REST documentation at a particular link (e.g., http://localhost:3000/explorer). In some embodiments, the framework provides a number of built-in models that have REST APIs. By default, for a model backed by a data source that supports it, the framework exposes a REST API that provides all the standard create, read, update, and delete (CRUD) operations.

As an example, consider a simple model called Location (that provides business locations), the framework automatically creates the following endpoints to illustrate the exposed REST APIs:

| Model API | HTTP Method | Example Path |
| --- | --- | --- |
| create( ) | POST | /locations |
| upsert( ) | PUT | /locations |
| exists( ) | GET | /locations/:id/exists |
| findById( ) | GET | /locations/:id |
| find( ) | GET | /locations |
| findOne( ) | GET | /locations/findOne |
| deleteById( ) | DELETE | /locations/:id |
| count( ) | GET | /locations/count |
| prototype.updateAttributes( ) | PUT | /locations/:id |

The above API follows the standard model REST API that most built-in models extend. To expose a model over REST, the developer must set the public property to true in /server/model-config.json:

```
...
"Role": {
    "dataSource": "db",
    "public": false
},
...
```

If the developer does not wish to expose certain CRUD operations, the developer can easily hide them by setting the model's shared property to false. For example, following the previous example, by convention custom model code would go in the file server/location.js. The developer would add the following lines to "hide" one of the predefined remote methods:

```
var isStatic = true;
MyModel.sharedClass.find('deleteById', isStatic).shared = false;
```

After adding these lines, the deleteById( ) operation and the corresponding REST endpoint will not be publicly available. In addition to the standard set of REST API endpoints that a model exposes, the developer can expose a model's static methods to clients over REST. These static methods are called, in some embodiments, remote methods. Additionally, the developer can define remote hooks that are functions called when a remote method is executed (typically, before or after the remote method).

In defining a remote method of some embodiments, the remote method must accept a callback with the conventional fn(err, result, . . . ) signature. A developer can expose a remote method in a model's custom script /common/models/mode/Name.js file by (1) exporting a function that takes the model as an argument (e.g., module.exports=function(modelName)), (2) in this function, defining the function as a static method of the model (e.g., modelName.functionName=function(args)), and (3) also in the function, calling remoteMethod( ) as described below to expose the function as a remote method. The first argument to remoteMethod( ) must be a string that exactly matches the static method defined in the second step.

A complete example of exposing a remote model, using a Person model, is illustrated below. The developer would add the following code in /common/models/person.js:

```
module.exports = function(Person){
    Person.greet = function(msg, cb) {
        cb(null, 'Greetings... ' + msg);
    }
    Person.remoteMethod(
        'greet',
        {
            accepts: [{arg: 'msg', type: 'string'}],
            returns: {arg: 'greeting', type: 'string'}
        }
    );
}
```

Running the above code in a local application and sending a POST request with the argument "LoopBack Developer" to the default URL http://localhost:3000/api/people/greet will then return:

```
{
  "greeting": "Greetings... LoopBack Developer"
}
```

As summarized above, to expose a function as a remote method on a model, a developer may call the model's remote.Method( ) function. The function's signature, in some embodiments, is modelName.remoteMethod(function, [options]), where (i) modelName is the name of the model, (ii) function is the remote method being defined, and (iii) options is the optional JSON object with metadata about the function as described in the following table:

| Option | Required? | Description |
|---|---|---|
| accepts | No | Describes the remote method's arguments. The callback argument is assumed; do not specify. |
| returns | No | Describes the remote method's callback arguments. The err argument is assumed; do not specify. |
| http.path | No | HTTP path (relative to the model) at which the method is exposed. |
| http.verb | No | HTTP method (verb) at which the method is available. One of: get post (default) put del all |
| description | No | A text description of the method. This is used by API documentation generators like Swagger. |

The "accepts" and "returns" properties in the above table define either a single argument as an object or an ordered set of arguments as an array. Each individual argument has properties for:

| Property (key) | Type | Descrption |
|---|---|---|
| arg | String | Argument name |
| type | String | Argument datatype; must be an accepted type. |
| required | Boolean | True if argument is required; false otherwise. |
| root | Boolean | For callback arguments: set this property to true if the user function has a single callback argument to use as the root object returned to remote caller. Otherwise the root object returned is a map (argument-name to argument-value). |
| http | String | For input arguments: a function or an object describing mapping from HTTP request to the argument value. |

An example of a single argument, specified as an object can be shown as: {arg: 'myArg', type: 'number'}, while an example of multiple arguments, specified as an array can be shown as:

```
[
  {arg: 'arg1', type: 'number', required: true},
  {arg: 'arg2', type: 'array'}
]
```

In some embodiments, there are two ways to specify HTTP mapping for input parameters (i.e., what the method accepts): (1) provide an object with a source property, and (2) specify a custom mapping function. To provide an object with a source property to specify HTTP mapping for input parameters, a developer can provide an object with a source property that has one of the values shown in the following table:

| Value of source property | Description |
|---|---|
| body | The whole request body is used as the value. |
| form | The value is looked up using req.param, which searches |
| query | route arguments, the request body and the query string. |
| path | Note that query and path are aliases for form. |
| req | The whole HTTP request object is used as the value. |

For example, an argument can get the whole request body as the value: {arg: 'data', type: 'object', http: {source: 'body'}}. As described above, to specify HTTP mapping for input parameters, a developer can also specify a custom mapping function. For example, the developer can specify:

```
{
  arg: 'custom',
  type: 'number',
  http: function(ctx) {
    // ctx is LoopBack Context object
    // 1. Get the HTTP request object as provided by Express
    var req = ctx.req;
    // 2. Get 'a' and 'b' from query string or form data
    // and return their sum as the value
    return +req.param('a') + req.param('b');
  }
}
```

On the other hand, if the developer does not specify a mapping, the framework will determine the value by determining whether the HTTP request parameter args with a JSON content exists (assuming name as the name of the input parameter to resolve). If there is a HTTP request parameter args with a JSON content, then the value of args['name'] is used as the value if it is defined. Otherwise, req.param('name') is returned as the value.

As mentioned above, a remote hook enables the developer to execute a function before or after a remote method is called by a client. The beforeRemote( ) function runs before the remote method and afterRemote( ) function runs after the remote method. For example:

```
var request = require('request');
Users.afterRemote('count', function(ctx, unused, next)
{
  request.post({
    url: 'http://another.server.com/',
    method: 'POST',
    json: ctx.result
  }, function(err, response) {
    if (err) console.error(err);
    next( );
  });
});
```

Below is another example that uses wildcards in the remote function name:

```
User.beforeRemote('*.save', function(ctx, user, next) {
  if(ctx.req.accessToken) {
    next( );
  } else {
    next(new Error('must be logged in to update'))
```

```
    }
});
User.afterRemote('*.save', function(ctx, user, next) {
    console.log('user has been saved', user);
    next( );
});
```

The second argument to the hook (user in the above example) is the ctx.result, which is not always available. More examples of remote hooks with wildcards to run a function before any remote method is called, are given below:

```
// ** will match both prototype.* and *.*
User.beforeRemote('**', function(ctx, user, next) {
    console.log(ctx.methodString, 'was invoked remotely'); //
users.prototype.save was invoked remotely
    next( );
});
Other wildcard examples
// run before any static method eg. User.find
User.beforeRemote('*', ...);
// run before any instance method eg. User.prototype.save
User.beforeRemote('prototype.*', ...);
// prevent password hashes from being sent to clients
User.afterRemote('**', function (ctx, user, next) {
    if(ctx.result) {
        if(Array.isArray(ctx.result)) {
            ctx.result.forEach(function (result) {
                result.password = undefined;
            });
        } else {
            ctx.result.password = undefined;
        }
    }
    next( );
});
```

In some embodiment, remote hooks are provided with a Context ctx object that contains transport-specific data (for HTTP: req and res). The ctx object also has a set of consistent APIs across transports. In some embodiments, applications that use loopback.rest( ) middleware, provide additional ctx properties such as ctx.req for expressing Request object; ctx.res for expressing Response object; ctx.req.accessToken for accessing token of the user calling the remote method (ctx.req.accessToken is undefined if the remote method is not invoked by a logged in user (or other principal)); and ctx.result (during afterRemote hooks) which will contain the data that is about to be sent to a client (a user can modify this object to transform data before it is sent). In addition to the hooks mentioned above, the user of some embodiments can define the following other hooks:

```
afterInitialize,
beforeValidate / afterValidate,
beforeSave / afterSave,
beforeCreate / afterCreate,
beforeUpdate / afterUpdate, and
beforeDestroy / afterDestroy.
```

As described before, a schema defines a static model that is backed by a database. A model can validate data before passing it on to a data store (such as a database) to ensure that it conforms to the backend schema. For example, the following code defines a schema and assigns it to the product model. The schema defines two fields (columns): name, a string, and price, a number. The field name is a required value.

```
var productSchema = {
    "name": { "type": "string", "required": true },
    "price": "number"
};
var Product = Model.extend('product',
productSchema);
```

A schema imposes restrictions on the model. If a remote client tries to save a product with extra properties (e.g., description), those properties are removed before the application saves the data in the model. Also, since name is a required value, the model will only be saved if the product contains a value for the name property. Rather than modifying the error responses returned by the server, the developer of some embodiments can localize the error message on the client. The validation error response contains error codes in error.details.codes, which enables clients to map errors to localized messages. Below is an example error response:

```
{
    "name": "ValidationError",
    "status": 422,
    "message": "The Model instance is not valid. \
See 'details' property of the error object for more info.",
    "statusCode": 422,
    "details": {
        "context": "user",
        "codes": {
            "password": [
                "presence"
            ],
            "email": [
                "uniqueness"
            ]
        },
        "messages": {
            "password": [
                "can't be blank"
            ],
            "email": [
                "Email already exists"
            ]
        }
    }
}
```

As stated before, most applications need to implement authentication and authorization on the users who access the data (i.e., control who (or what) can access data). Typically, this involves requiring users to login to access protected data, or requiring authorization tokens for other applications to access protected data.

Applications of some embodiments access data through models, hence controlling access to data means putting restrictions on models. That is, specifying who or what can read, write, or change the data in the models. In some embodiments, the general process to implement access control for an application is first to define the user roles that the application requires. For example, the developer might create roles for anonymous users, authorized users, and administrators.

Next, the developer can define access for each role and model method. For example, the developer might enable anonymous users to read a list of banks, but not allow them to do anything else. In some embodiments, the models have a set of built-in methods, and each method maps to either the READ or WRITE access type. In essence, this step amounts to specifying whether access is allowed for each role and each model in addition to the access type. Lastly, the developer implements the authentication, i.e., in the application, by adding code to create (register) new users, login users (get and use authentication tokens), and logout users.

In order to control data access, the application developer specifies the application's users' roles. The first step in specifying user roles is to determine what roles the application needs. Most applications will have un-authenticated or anonymous users (those who have not logged in) and authenticated users (those who have logged in). Additionally, many applications will have an administrative role that provides broad access rights. Applications of some embodiments can have any number of additional user roles as appropriate.

The next step is specifying the user access types. The framework in some embodiments provides a built-in User model with a corresponding REST API that inherits all the "CRUD" (create, read, update, and delete) methods of the data access object. Each data access method on the User model maps to either the "READ" or "WRITE" access type, as follows:

READ:
  exists—Boolean method that determines whether a user exists
  findById—Find a user by ID
  find—Find all users that match specified conditions.
  findOne—Finds a single user instance that matches specified conditions.
  count—Returns the number of users that match the specified conditions.
WRITE:
  create—create a new user
  upsert (equivalent to updateOrCreate)—update or insert a new user record.
  deleteById (equivalent to removeById or destroyById)—delete the user with the specified ID.

For other methods, the default access type of some embodiments is "EXECUTE". For example, a custom method maps to the "EXECUTE" access type. The table below is an example of the access control specification for an access control application of some embodiments. It specifies "ALLOW" or "DENY" for any combination of role and access types (READ or WRITE for a specific model).

| Model and access type | Anonymous user role | Authenticated user role | Teller (admin) role |
|---|---|---|---|
| READ Bank | ALLOW | ALLOW | ALLOW |
| WRITE Bank | DENY | DENY | ALLOW |
| READ Account | DENY | ALLOW | ALLOW |
| WRITE Account | DENY | DENY | ALLOW |
| READ Transaction | DENY | ALLOW | ALLOW |
| WRITE Transaction | DENY | DENY | DENY |

Some embodiments use the Yeoman ACL generator to define access controls as the simplest way to define access control for an application. This enables the developer to create a static definition for the application before runtime. The Yeoman generator prompts the developer for all the necessary information as explained below. In some embodiments, the basic process for an application to create and authenticate users is first to register a new user with the User.create( ) method, inherited from the generic model object. The next step is to call User.login( ) to request an access token from the client application on behalf of the user. The developer can create his own access tokens to customize authentication. User.login( ) is a good example of doing that. The developer needs to do verification on the server though to prevent someone from creating tokens even though they don't belong to them. The last step is then to invoke an API using the access token. The developer can provide the access token in the HTTP header or as a query parameter to the REST API call.

In order to create users, an application developer can create (register) a new user with the User.create method as follows (on a client side with calling a REST API and on the server side writing in JS):

```
REST
curl -X POST -H "Content-Type:application/json" \
-d '{"email": "me@domain.com", "password": "secret"}' \
http://localhost:3000/api/users
Node.js
User.create({
    email: 'me@domain.com',   // required by default
    password: 'secret'        // required by default
}, function (err, user) {
    console.log(user.id);     // => the user id (default type:
                              db specific | number)
    console.log(user.email);  // => the user's email
});
```

Typically, the developer might want to add methods to use as a part of the registration process to determine whether a given username is available or if an email address is already registered. One way to do this is to add these methods as beforeRemote hooks on the User object. The developer then can authenticate a user by calling the User.login( ) method and providing a credentials object. By default, each user must provide a password and either a username or email. The developer may also specify how long the access token should be valid by providing a ttl (time to live) in a temporal scale (e.g., in seconds). The following example illustrates this on a client side with calling a REST API and on the server side in JS:

```
REST
curl -X POST -H "Content-Type:application/json" \
-d '{"email": "me@domain.com", "password": "secret", "ttl": 1209600000}' \
http://localhost:3000/api/users/login
This example returns:
{
    "id":
"GOkZRwgZ61q0XXVxvxlB8TS1D6lrG7Vb9V8YwRDfy3YGAN7TM7EnxWHqdbIZfheZ",
    "ttl": 1209600,
    "created": "2013-12-20T21:10:20.377Z",
    "userId": 1
}
The id property in this example is the user's access token.
Node.js
```

```
var TWO_WEEKS = 1000 * 60 * 60 * 24 * 7 * 2;
User.login({
    email: 'me@domain.com',  // must provide email or "username"
    password: 'secret',   // required by default
    ttl: TWO_WEEKS   // keep the AccessToken alive for at least two weeks
}, function (err, accessToken) {
    console.log(accessToken.id);   // => GOkZRwg... the access token
    console.log(accessToken.ttl);   // => 1209600 time to live
    console.log(accessToken.created);   // => 2013-12-20T21:10:20.377Z
    console.log(accessToken.userId);   // => 1
});
```

If a login attempt is successful, a new AccessToken is created that points to the user. This token is required when making subsequent REST requests for the access control system to validate that the user can invoke methods on a given Model.

```
REST
ACCESS_TOKEN=6Nb2ti5QEXIoDBS5FQGWIz4poRFiBCMMYJbYXSGHWuulOuy0GTEuGx2-
VCEVvbpBK
# Authorization Header
curl -X GET -H "Authorization: $ACCESS_TOKEN" \
http://localhost:3000/api/widgets
# Query Parameter
curl -X GET http://localhost:3000/api/widgets?access_token=$ACCESS_TOKEN
```

A user will be effectively logged out by deleting the access token they were issued at login. This affects only the specified access token; other tokens attached to the user will still be valid. To destroy access tokens over REST API, the following /logout endpoint can be used:

```
REST
ACCESS_TOKEN=
6Nb2ti5QEXIoDBS5FQGWIz4poRFiBCMMYJbYXSGHWuulOuy0GTEuGx-
2VCEVvbpBK
VERB=POST # any verb is allowed
# Authorization Header
curl -X VERB -H "Authorization: $ACCESS_TOKEN" \
http://localhost:3000/api/users/logout
# Query Parameter
curl -X VERB http://localhost:3000/api/users/logout?access_token=$ACCESS_TOKEN
Node.js
var USER_ID = 1;
var ACCESS_TOKEN =
'6Nb2ti5QEXIoDBS5FQGWIz4poRFiBCMMYJbYXSGHWuulOuy0GT-
EuGx2VCEVvbpBK';
// remove just the token
var token = new AccessToken({id: ACCESS_TOKEN});
token.destroy( );
// remove all user tokens
AccessToken.destroyAll({
    where: {userId: USER_ID}
});
```

As described before, in order to control data access, the first step is to specify the application users' roles. The framework of some embodiments enables the developer to define both static and dynamic roles. Static roles are stored in a data source and are mapped to users. In contrast, dynamic roles are not assigned to users and are determined during access. Below is an example of defining a new static role and assigning a user to that role:

```
// Create a new user
User.create({name: 'John', email: 'x@y.com', password: 'foobar'},
    function (err, user) {
    // Create the static admin Role
    Role.create({name: 'admin'}, function (err, role) {
        // Make John an admin
        role.principals.create({principalType: RoleMapping.USER,
            principalId: user.id});
    });
});
```

After defining the new static role, the developer can use the role in the access controls. For example, the developer can add the following lines to the file models.json to enable users in the "admin" role to call all REST APIs:

```
{
"accessType": "*",
"permission": "ALLOW",
"principalType": "ROLE",
"principalId": "admin"
}
```

Sometimes static roles of some embodiments are not flexible enough and therefore dynamic roles are needed. Below is an example of defining a user defined dynamic role:

```
Role.registerResolver('$friend', function(role, ctx, callback) {
  var targetUserId = ctx.modelId;
  // Below has a callback signature: callback(err, isFriend)
  MyUser.isFriend(targetUserId, ctx.getUserId( ), callback);
});
```

Using the dynamic role defined above, we can restrict access of user info to users that are friends.

```
{
"accessType": "READ",
"permission": "ALLOW",
"principalType": "ROLE",
"principalId": "$friend"
}
```

Some embodiments allow to manually enable the access controls. However, in these embodiments, if the application is created with slc loopback, then there is no need to do anything to enable the access control. Otherwise, to add access control manually, the developer must call the Loop-Back enableAuth( ) method. The following example shows how a user can manually add an access control:

```
var loopback = require('loopback');
var app = loopback( );
app.enableAuth( );
```

In some applications, the developer may need to make changes to ACL definitions at runtime. There are two different ways to change ACL definitions at runtime: (1) call the data source method createModel( ) and provide an ACL specification (in JSDL) as an argument, and (2) call the ACL.create( ) method. A user can also control access to a model by passing a JSDL specification when creating the model with the data source createModel( ) method:

```
var Customer = loopback.createModel('Customer', {
  name: {
    type: String,
    // Property level ACLs
    acls: [
      {principalType: ACL.USER, principalId: 'u001',
        accessType: ACL.WRITE, permission: ACL.DENY},
      {principalType: ACL.USER, principalId: 'u001',
        accessType: ACL.ALL, permission: ACL.ALLOW}
    ]
  }
}, {
  // By default, access will be denied if no matching ACL entry is found
```

-continued

```
  defaultPermission: ACL.DENY,
  // Model level ACLs
  acls: [
    {principalType: ACL.USER, principalId: 'u001',
      accessType: ACL.ALL, permission: ACL.ALLOW}
  ]
});
```

ACLs defined as part of the model creation are hard-coded into the application. The framework of some embodiments also allows the user to dynamically define ACLs through code or a dashboard. The ACLs can also be saved to and loaded from a database in some embodiments.

In general, some client applications (e.g., mobile applications) need to be able to operate without constant network connectivity. This means the client application must synchronize data with the server application after a disconnection period. In order to achieve synchronization, (1) the client (browser) application should replicate changes made in the server application, and (2) the server application should replicate the changes made in the client (browser) application. The synchronization (sync) process replicates data from the source to the target, and the target calls a replication API. The replication API of some embodiments is a JavaScript API, and thus works with a JavaScript client. The replication API of other embodiments can be other non-JS APIs that can run on non-JS clients.

Replication means intelligently copying data from one location to another. The framework copies data that has changed from source to target, but does not overwrite data that was modified on the target since the last replication. So, the sync process of some embodiments is a bi-directional replication. In general, there may be conflicts when performing replication. For example, while disconnected, a user may make changes on the client that conflict with changes made on the server. When an object or field is modified both locally and remotely and there is a risk of generating conflicts, the framework of some embodiments handles the conflict resolution for the users, and enables the developers to easily present a user interface in the application to allow the end user to make informed decisions to resolve conflicts when they occur.

The framework of some embodiments implements synchronization using the browser API that provides the same client JS API as for the server. Thus, the framework in the browser is sometimes referred to as isomorphic, because a user can call exactly the same APIs on the client and server. The framework in the browser of some embodiments uses Browserify to handle dependencies and gulp to generate the client API based on the backend models and REST API.

In addition to basic client-server replication, the framework of some embodiments also supports replicating data (1) from a server application to another server application and (2) from one database to another database. Synchronization as described above to handle offline operation is called offline sync in some embodiments. The framework also provides the ability to consolidate (or "batch") data changes the user makes on the device and send them to the server in a single HTTP request. This type of synchronization is called online sync in some embodiments.

A conflict occurs when a change to a model is not based on the previous revision of the model. The callback of Model.replicate( ) takes err and conflict[ ]. Each conflict represents a change that was not replicated and must be manually resolved. The developer can fetch the current versions of the local and remote models by calling conflict-.models( ). The developer can also manually merge the conflict by modifying both models. Calling conflict.resolve( ) will set the source change's previous revision to the current revision of the (conflicting) target change. Since the changes are no longer conflicting and appear as if the source change was based on the target, they will be replicated normally as part of the next replicate( ) call.

The model object provides a number of methods to support sync, mixed in via the DataModel object. Some of these sync methods are as follows:

1. diff—Get a set of deltas and conflicts since the given checkpoint.
2. changes—Get the changes to a model since a given checkpoint. Provide a filter object to reduce the number of results returned.
3. checkpoint—Create a checkpoint.
4. currentCheckpoint—Get the current checkpoint ID.
5. replicate—Replicate changes since the given checkpoint to the given target model.
6. createUpdates—Create an update list for Model.bulkUpdate( ) from a delta list from Change.diff( ).
7. bulkUpdate—Apply an update list.
8. getChangeModel—Get the Change model.
9. getSourceId—Get the source identifier for this model/dataSource.
10. enableChangeTracking—Start tracking changes made to the model.
11. handleChangeError—Handle a change error. Override this method in a subclassing model to customize change error handling.
12. rectifyChange—Tell the framework that a change to the model with the given ID has occurred.
13. Created—an entry in the change list without a previous revision or if an entry does not exist and the given model does exist
14. Modified—an entry with a current and previous revision
15. Deleted—an entry with only a previous revision or if an entry does not exist and the given model also does not exist In some embodiments, the change list and replication can be used against existing data sources with large sets of data. This is made possible by using the revision semantics described above. The changes made without the framework API, however, will be treated as "created" or "deleted" change list entries. The Changes made to a data source that supports replication will be tracked as revisions in that data source's change list. A data source's change list is stored like any other model data. Each model has its own "Change" model. The "Change" model may be attached to any data source. This allows the user to store the change lists in any data source.

During replication a user may supply a filter in some embodiments. The less data the user tries to replicate, the faster and more memory efficient the replication will be. If the user is manually implementing the replication algorithm, the user should run as many steps in the replication process in parallel as possible. This is usually called the "bulk update" step(s).

As discussed above, the framework in the client machine is sometimes referred to as isomorphic framework, because it provides the exact same API as the server framework. A user can create models and use the memory adapter and have his application fully running in the browser machine. The user can seamlessly connect models using the Remote Connector to connect different devices (e.g., browser to server or server to server). Some embodiments accomplish this by enhancing remoting to be able to accept and return ModelTypes in addition to the JSON and its JSON primitives. Because the models do not need to know where they are being run, the developer can share the same API regardless of where developer's code is running, thus making the API isomorphic. Models are referenced through one way—"local" versus "remote". This is a foundation for how the replication API for data synchronization between browser and server is built in some embodiments.

In the browser, the main application file calls the function exported by the boot module to setup the application by executing the instructions contained in the browser bundle:

```
browser-app.js
var loopback = require('loopback');
var boot = require('loopback-boot');
var app = module.exports = loopback( );
boot(app);
```

The application object created above can be accessed via require('loopback-app'), where loopback-application is the identifier used for the main application file in the Browserify build shown above. Below is a simple example demonstrating this concept:

```
index.html
<script src="app.bundle.js"> </script>
<script>
   var app = require('loopback-app');
   var User = app.models.User;
   User.login({
      email: 'test@example.com',
      password: '12345'
   }, function (err, res) {
      if (err) {
         console.error('Login failed: ', err);
      } else {
         console.log('Logged in.');
      }
   });
</script>
```

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
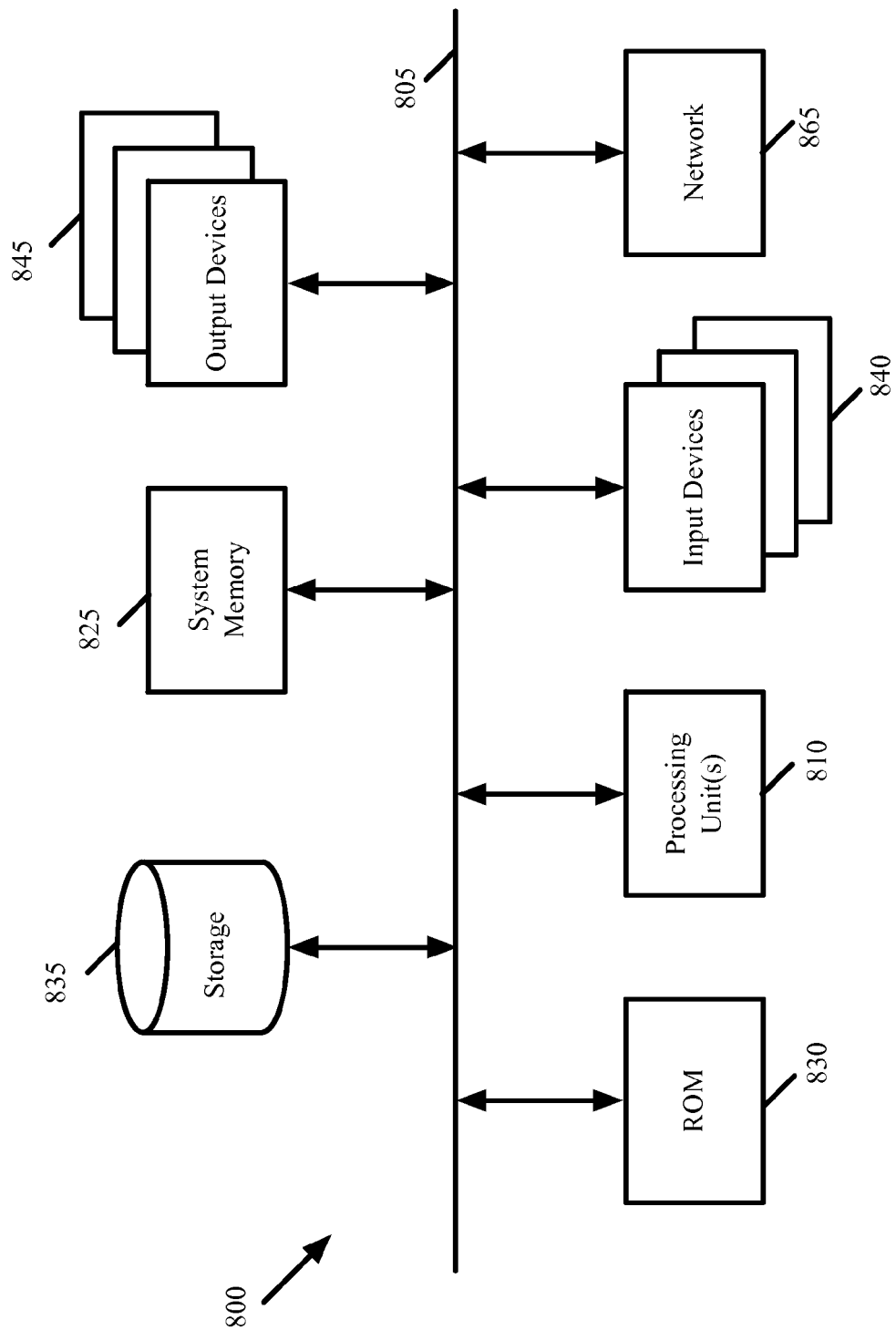
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

What is claimed is:

1. A non-transitory machine readable medium of a server storing a program for processing application programming interface (API) requests received from mobile devices, the program executable by one or more processors of the server, the program comprising:

a runtime instantiator for instantiating JavaScript (JS) objects, said instantiated JS objects configured to process the API requests, each JS object instantiated based on a JS model that comprises (i) a JS file storing a set of behavioral descriptions of the JS objects and (ii) a JS object notation (JSON) file storing a set of property descriptions of the JS objects, wherein the JSON file includes at least one validation rule to reject a data tuple unless the data tuple meets a required constraint specified in the validation rule;

a data abstractor for serving as an interface between the JS objects and a set of data storages from which the JS objects retrieve data while processing a plurality of the API requests; and a data connector for connecting the data abstractor with the set of data storages by implementing a data exchange logic for the set of data storages, wherein the set of property descriptions of the JSON file, based on a JS object that is instantiated, comprises a description of a control logic for restricting access to one or more data tuples that are available to the JS object upon processing an API request, and wherein the control logic comprises at least one access control list (ACL) rule to ensure that a data tuple that is exchanged as part of the API request with the JS object satisfies a set of access control criteria.

2. The non-transitory machine readable medium of claim 1, wherein the set of data storages includes a relational database and a data storage that is not a relational database.

3. The non-transitory machine readable medium of claim 1, wherein the data abstractor provides a set of functions that allows the JS objects to exchange data with the set of data storages.

4. The non-transitory machine readable medium of claim 1, wherein the data abstractor performs create, retrieve, update, and delete (CRUD) functions that connect the JS objects to the data storages.

5. The non-transitory machine readable medium of claim 4, wherein through the CRUD functions, the data abstractor allows the JS object to create a new data record in a data storage, to read a data record in the data storage, to write to a data record in the data storage, and to delete a data record in the data storage.

6. The non-transitory machine readable medium of claim 1, wherein the set of property descriptions of a JSON file, based on the JS object that is instantiated, comprises a type of a data storage from which the JS object retrieves data.

7. The non-transitory machine readable medium of claim 1, wherein to implement the data exchange logic, the data connector uses data storage drivers.

8. The non-transitory machine readable medium of claim 1, wherein the program further comprises a REST (Representational State Transfer) web service processor for making a plurality of the JS objects accessible to other devices through REST web services.

9. The non-transitory machine readable medium of claim 8, wherein the program further comprises a web socket manager for managing connection sessions between the JS objects and the other devices.

10. The non-transitory machine readable medium of claim 9, wherein at least a subset of the connection sessions is between JS objects on the server and JS objects on client devices.

11. The non-transitory machine readable medium of claim 10, wherein the JS objects on the client devices receive API request from other modules on the client devices, and either process the API requests locally on the client devices or relay the API requests to the JS objects on the server.

12. The non-transitory machine readable medium of claim 1, wherein the set of property descriptions of the JSON file, based on the JS object that is instantiated, comprises a set of attributes that identifies a data storage from which the JS object retrieves data, the set of attributes comprising at least one of a location of the data storage, a name of the data storage, a set of fields of the data storage, and a set of field attributes of the data storage.

13. The non-transitory machine readable medium of claim 1, wherein rejecting the data tuple comprises rejecting an identification of the data tuple as a particular type of data tuple and the required constraint comprises identifying a particular attribute as being an attribute of the data tuple.

14. A server comprising:
a memory;
one or more processors; and
a non-transitory machine readable medium storing a program, which when executed by the one or more processors via the memory, processes application programming interface (API) requests received from mobile devices, the program comprising sets of instructions for:

instantiating a JavaScript (JS) object, said instantiated JS object configured to process the API requests, the JS object instantiated based on a JS model comprising (1) a JS file that stores a description of a behavior of the JS object and (2) a JS object notation (JSON) file that stores a description of properties of the JS object, wherein the JSON file includes at least one validation rule to reject a data tuple unless the data tuple meets a required constraint specified in the validation rule;

specifying a data abstractor for serving as an interface between the JS object and a set of data storages from which the JS object retrieves data while processing a plurality of the API requests; and specifying a data connector for connecting the data abstractor with the set of data storages by implementing a data exchange logic for the set of data storages, wherein the description of the properties of the JS object comprises a description of a control logic for restricting access to at least one or more data tuples in a data storage that are available to the JS object upon processing the API request, and wherein the control logic comprises at least one access control list (ACL) rule to ensure that a data tuple that is exchanged as part of the API request with the JS object satisfies a set of access control criteria.

15. The server of claim 14, wherein the program further comprises a set of instructions for specifying a connector that connects the interface with the set of data storages by implementing a data exchange logic for the set of data storages.

16. The server of claim 15, wherein the set of instructions for specifying the connector comprises a set of instructions for using the set of data storages' drivers to implement the data exchange logic.

17. The server of claim 14, wherein the data tuple that is exchanged as part of the API request with the JS object is a first data tuple, wherein the validation rule allows a second data tuple to be exchanged with the JS object when the second data tuple meets at least one data-type constraint.

18. The server of claim 17, wherein the ACL and validation rules are implemented as function call hooks so that at runtime, the JS object calls a set of one or more rule processing engines that process the ACL and validation rules before or after processing an API request.

\* \* \* \* \*